May 15, 1956  R. G. FOWLER ET AL  2,745,601
KEY-RESPONSIVE CALCULATING MACHINE
Filed July 20, 1951  15 Sheets-Sheet 1

INVENTORS
ROLAND G. FOWLER
NELSON R. FRIEBERG
& OSCAR F. LARSEN

BY

THEIR ATTORNEYS

INVENTORS
ROLAND G. FOWLER
NELSON R. FRIEBERG
& OSCAR F. LARSEN
BY Carl Berst
Justus ...
THEIR ATTORNEYS May 15, 1956  R. G. FOWLER ET AL  2,745,601
KEY-RESPONSIVE CALCULATING MACHINE
Filed July 20, 1951  15 Sheets-Sheet 4

INVENTORS
ROLAND G. FOWLER
NELSON R. FRIEBERG
& OSCAR F. LARSEN
BY
THEIR ATTORNEYS

May 15, 1956 R. G. FOWLER ET AL 2,745,601
KEY-RESPONSIVE CALCULATING MACHINE
Filed July 20, 1951 15 Sheets-Sheet 5

INVENTORS
ROLAND G. FOWLER
NELSON R. FRIEBERG
& OSCAR F. LARSEN
BY
THEIR ATTORNEYS

INVENTORS
ROLAND G. FOWLER
NELSON R. FRIEBERG
& OSCAR F. LARSEN

BY

THEIR ATTORNEYS

May 15, 1956  R. G. FOWLER ET AL  2,745,601
KEY-RESPONSIVE CALCULATING MACHINE
Filed July 20, 1951  15 Sheets-Sheet 7
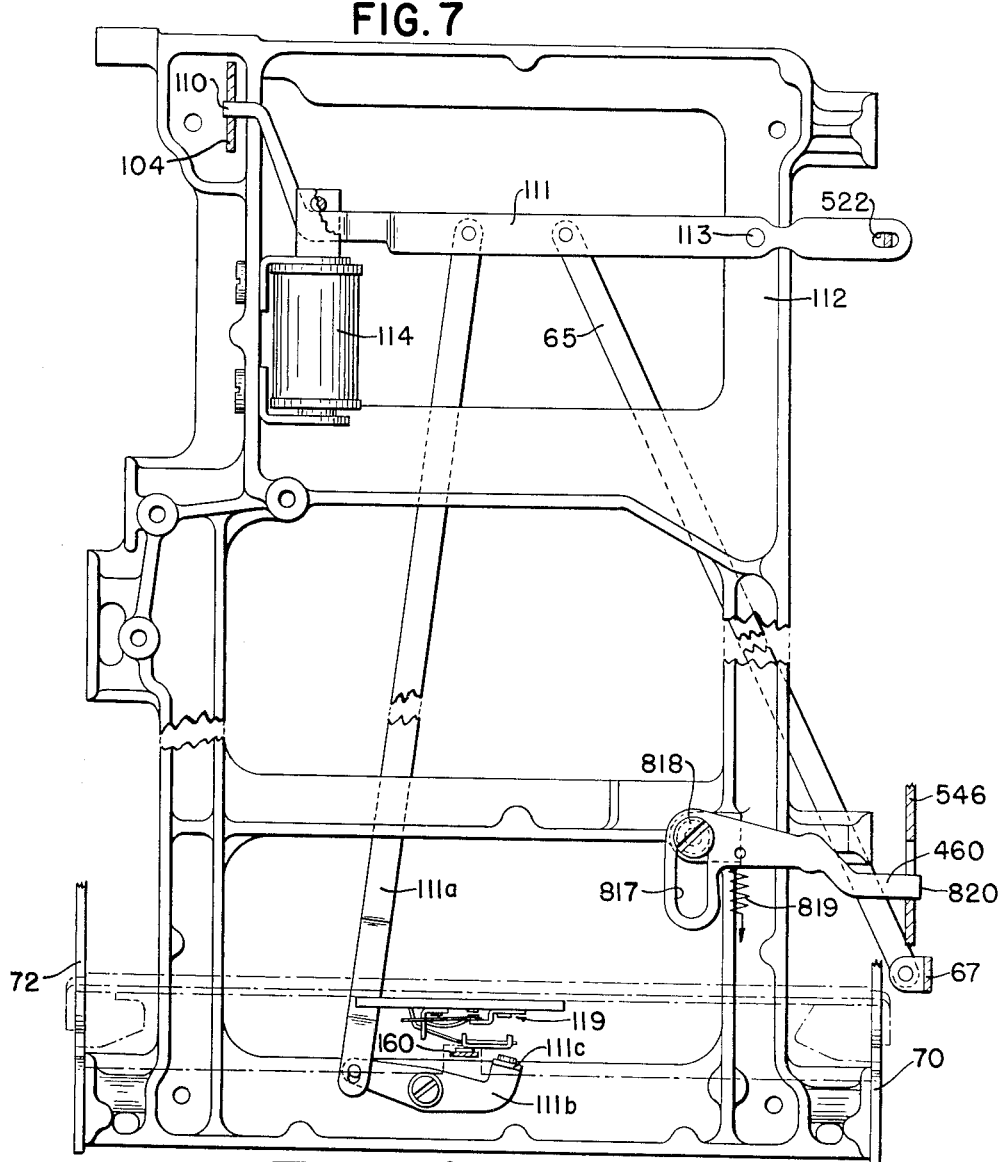
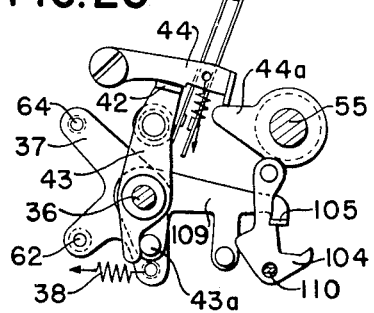
INVENTORS
ROLAND G. FOWLER
NELSON R. FRIEBERG
& OSCAR F. LARSEN
THEIR ATTORNEYS

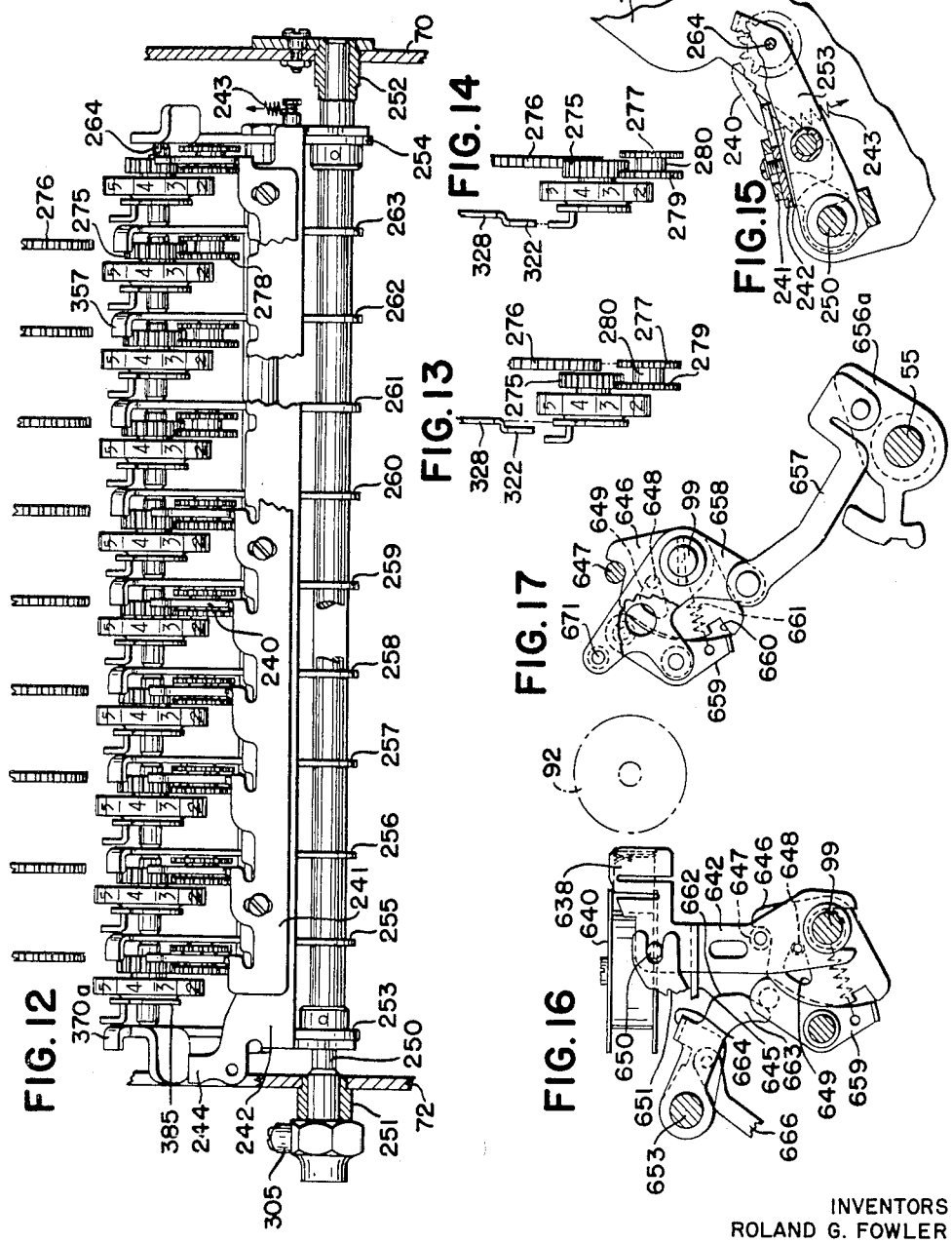

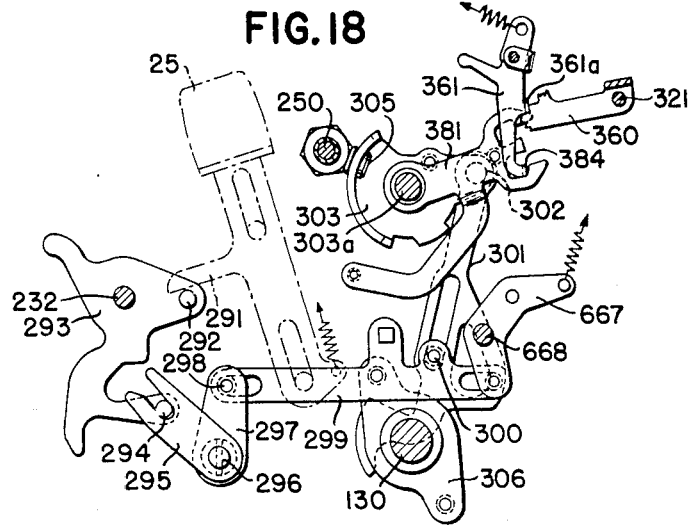

May 15, 1956 R. G. FOWLER ET AL 2,745,601
KEY-RESPONSIVE CALCULATING MACHINE
Filed July 20, 1951 15 Sheets-Sheet 10
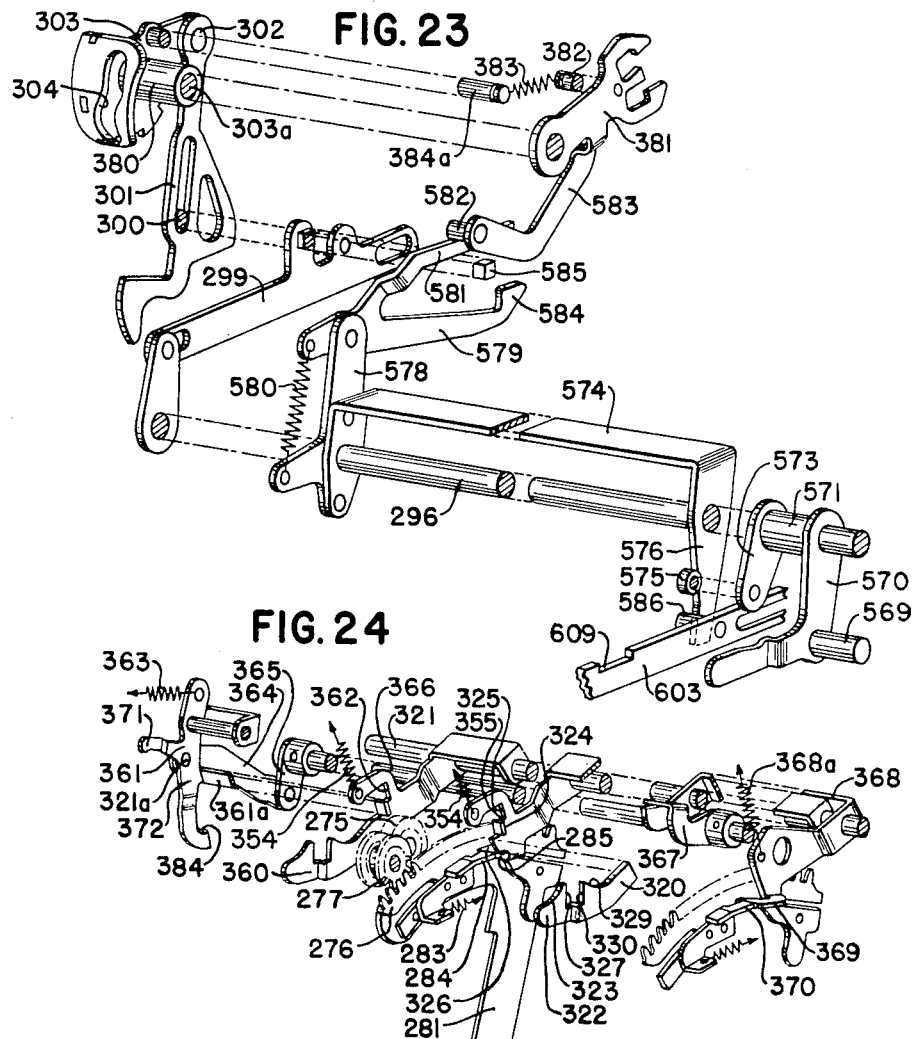
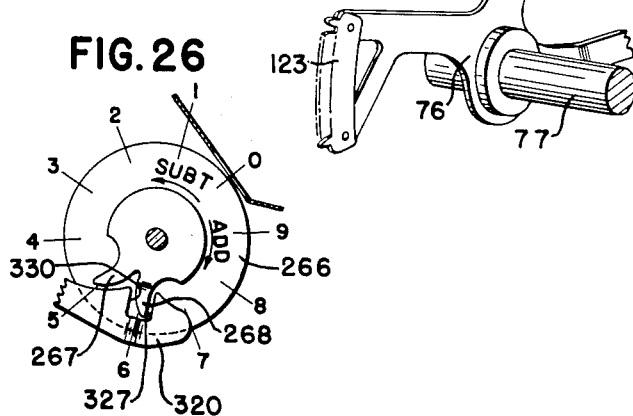
INVENTORS
ROLAND G. FOWLER
NELSON R. FRIEBERG
& OSCAR E. LARSEN
BY
THEIR ATTORNEYS May 15, 1956
R. G. FOWLER ET AL
2,745,601
KEY-RESPONSIVE CALCULATING MACHINE
Filed July 20, 1951
15 Sheets-Sheet 11
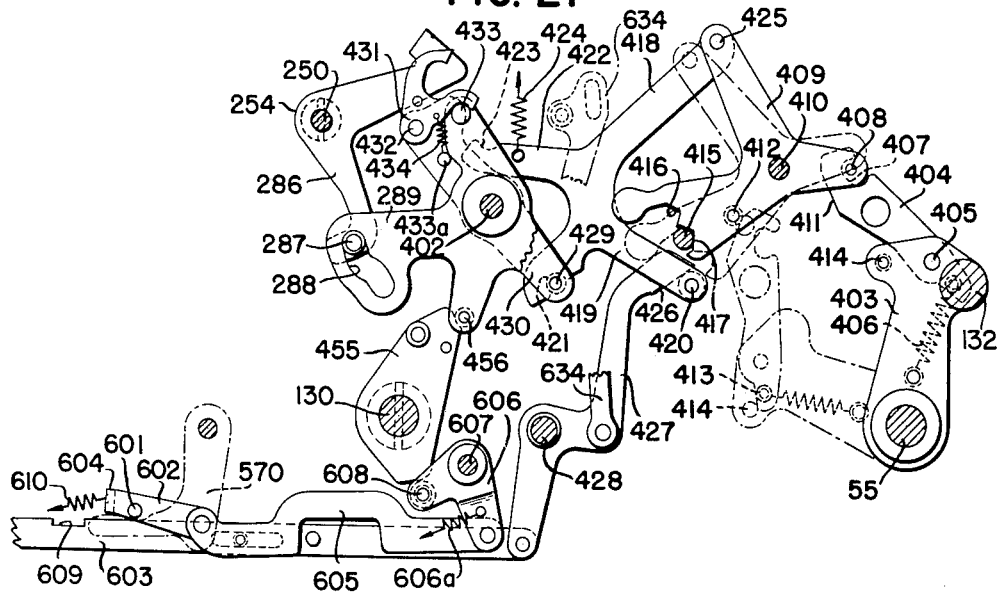
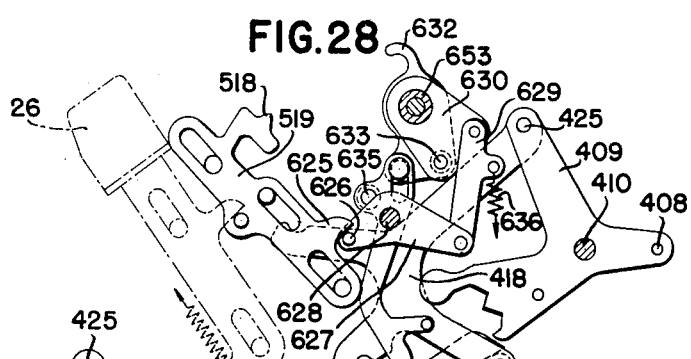
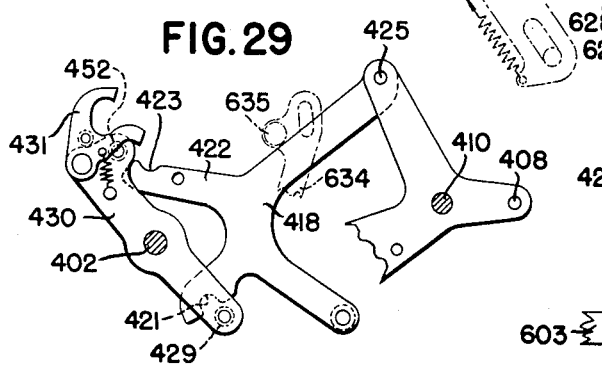
INVENTORS
ROLAND G. FOWLER
NELSON R. FRIEBERG
& OSCAR F. LARSEN
BY Carl Bent
Justin S Lamston
THEIR ATTORNEYS May 15, 1956     R. G. FOWLER ET AL     2,745,601
KEY-RESPONSIVE CALCULATING MACHINE
Filed July 20, 1951     15 Sheets-Sheet 12
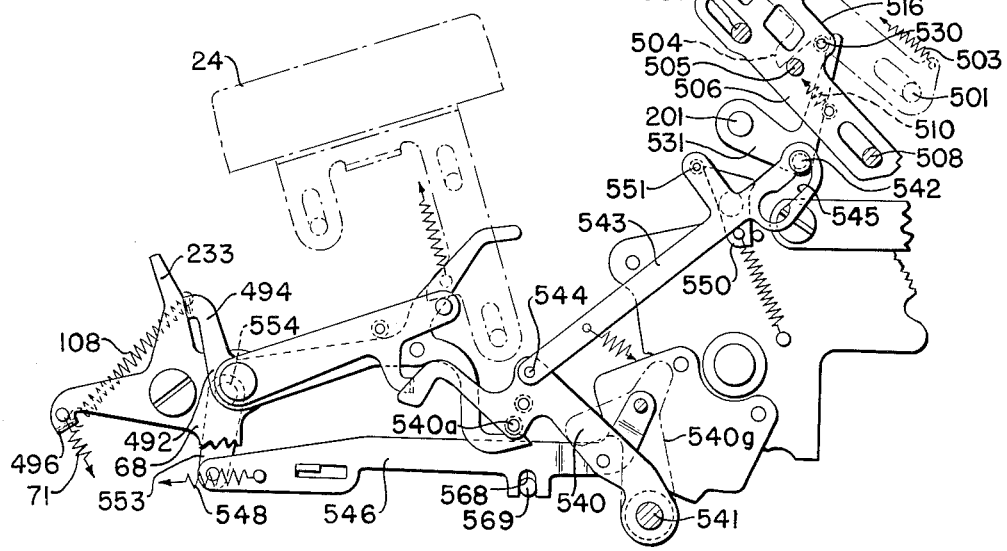
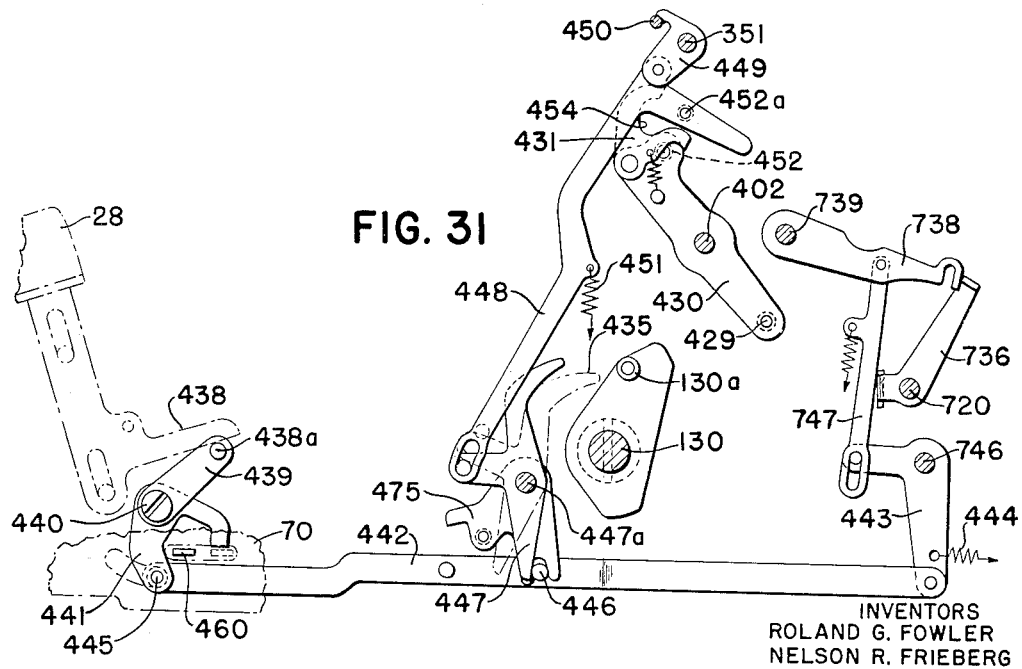
INVENTORS
ROLAND G. FOWLER
NELSON R. FRIEBERG
& OSCAR F. LARSEN
BY
THEIR ATTORNEYS

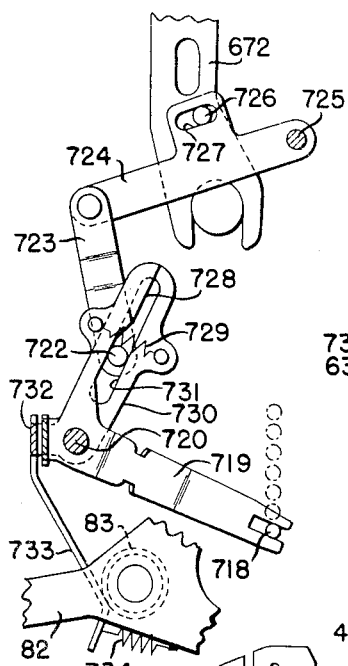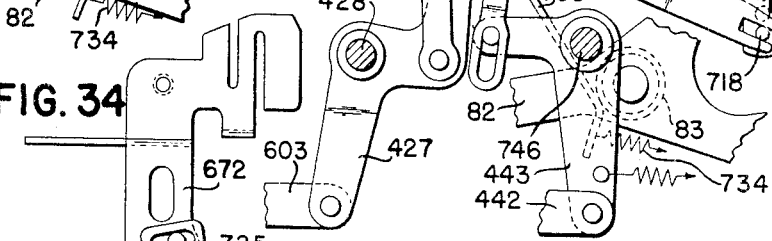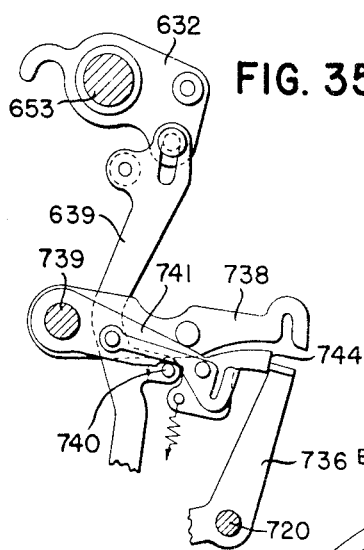

May 15, 1956  R. G. FOWLER ET AL  2,745,601
KEY-RESPONSIVE CALCULATING MACHINE
Filed July 20, 1951  15 Sheets-Sheet 14
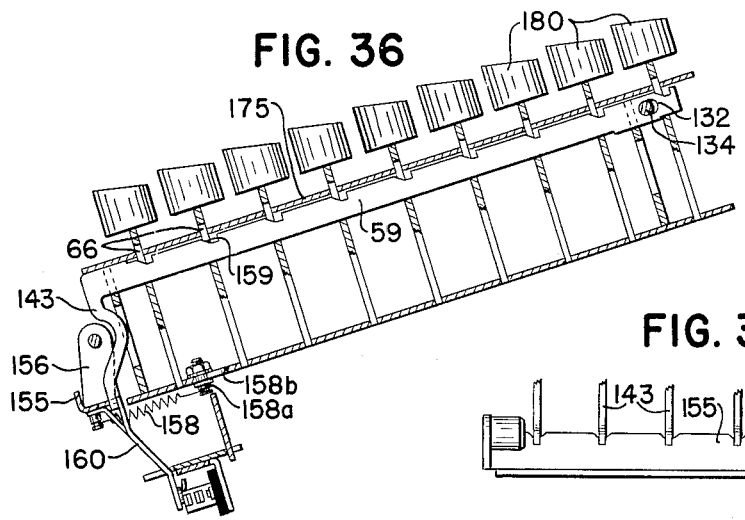
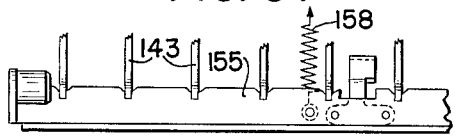
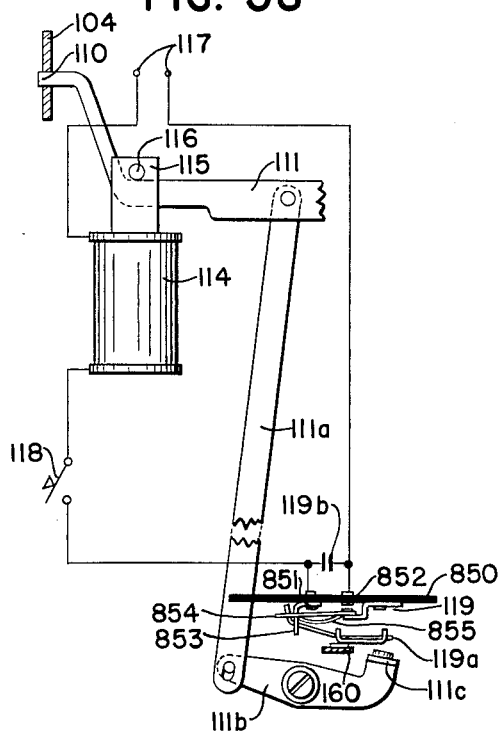
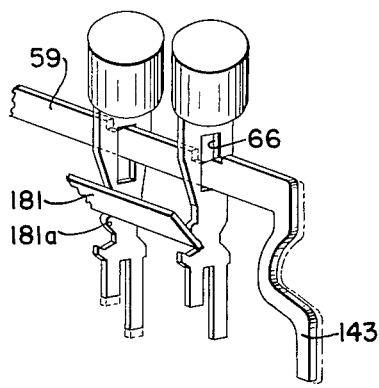
INVENTORS
ROLAND G. FOWLER
NELSON R. FRIEBERG
& OSCAR F. LARSEN
BY
THEIR ATTORNEYS

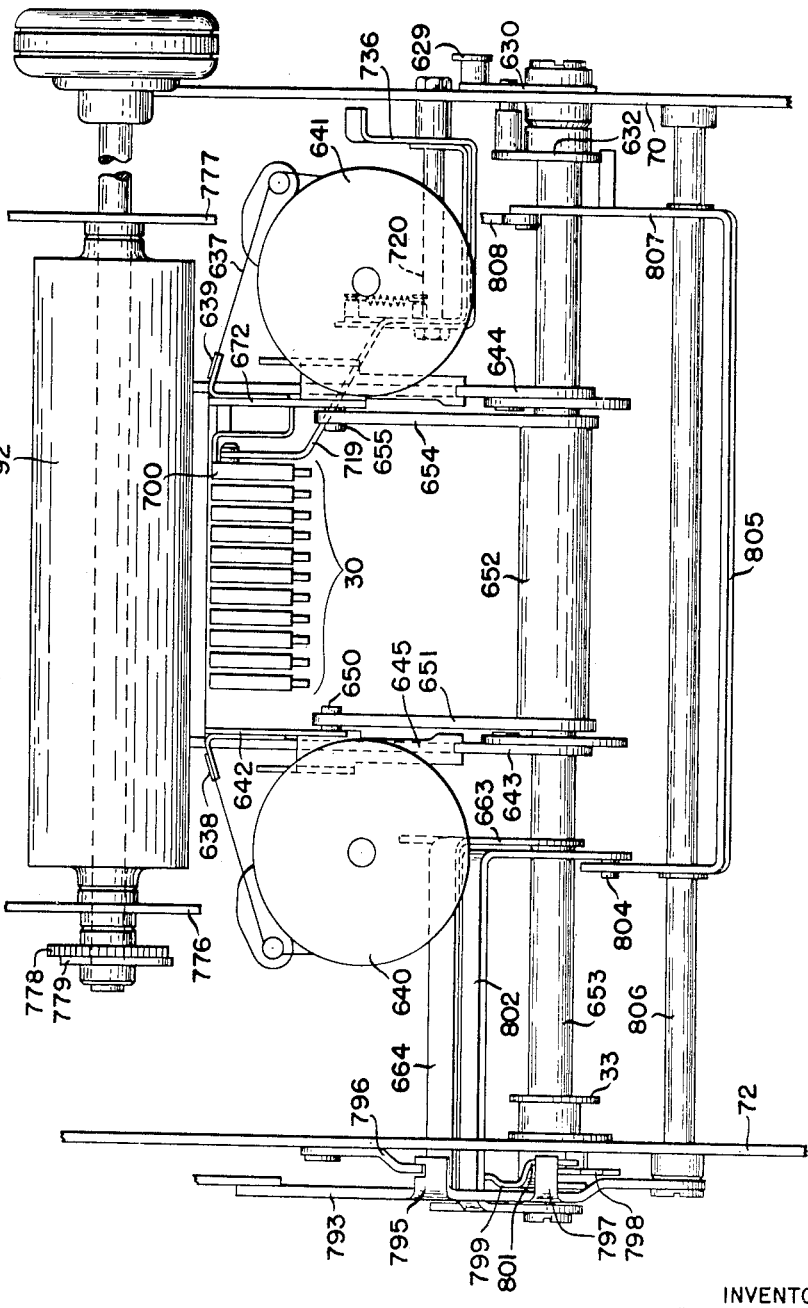

United States Patent Office 2,745,601
Patented May 15, 1956

2,745,601

KEY-RESPONSIVE CALCULATING MACHINE

Roland G. Fowler, Newfield, and Nelson R. Frieberg and Oscar F. Larsen, Ithaca, N. Y., assignors to The National Cash Register Company, Dayton, Ohio, a corporation of Maryland Application July 20, 1951, Serial No. 237,758

9 Claims. (Cl. 235—62)

This invention relates to a calculating machine, and more particularly pertains to a power-operated machine of the flexible full keyboard type in which an amount to be entered may be set up by operation of any of the keys and the machine thereafter set in operation by extra pressure exerted on any operated key.

All of the keys in each denominational order, that is to say all of the keys on the keyboard, have two stages of operation, depression of a key through a certain distance and against a slight resistance latching such key in depressed position and thus setting up the amount represented thereby for entry into the machine during the ensuing machine cycle, and further depression of the last key used to set up an amount to be entered, against a second stage of resistance encountered after the latching point of a key has been reached, causing the initiation of a cycle of machine operation in which the amount represented by all operated keys is entered.

The amount to be entered may be a multi-digit number set up key by key, either starting with the highest order digit, as is customary, or starting with the lowest order digit, or in any other order. The whole amount may then be entered into the machine by operating any of the set keys a slight distance further to initiate a machine operation.

The added operational movement of the digit keys necessary to cause the initiation of a machine cycle is against such an amount of added resistance that the operator senses the end point of the latching movement, as such added resistance is next encountered immediately thereafter, enabling the operator to set up a multi-digit number without accidentally causing a premature initiation of the operating cycle.

Moreover, it is possible for the operator to set up keys simultaneously, giving all or any of them an extra movement to initiate the machine cycle, much as is done in key-operated machines, except the entry of the amount in this machine is accomplished by a power operation of the main operating means.

The machine of this invention receives and accumulates positive and negative entries and true positive and negative totals may be taken therefrom, both the entries and totals being printed.

It is evident, therefore, that this invention provides a calculating machine of the power-driven type, in which the possible speed of operation is substantially increased over known machines in that the operator in setting up a number to be entered into the machine merely gives the last digit key used to set up the number an extra movement inwardly to initiate the machine cycle, eliminating movements of the operator's hand to a motor bar or other machine cycle-initiating control. No auxiliary keys or conventional motor bars are necessary, and hence do not demand the attention or require extra movements of the operator's hands, although conventional motor bars for addtion and subtraction are provided as auxiliary cycle-initiating means.

From what will be disclosed, it will become apparent that continued depression of a key or keys beyond the latching point, against the normal key restoring action will result in repeated entry of the amount represented by the operated keys, as the machine will continue cycling.

The invention is shown as incorporated into a machine of the Allen-Wales type, disclosed in the application for United States Letters Patent, Serial No. 171,119, filed June 29, 1950 (now Patent No. 2,665,063, issued January 5, 1954), by Nelson R. Frieberg and Oscar F. Larsen. In this machine, of the full keyboard type, there is a key for each digit in each denominational order, and a multi-digit number usually is set up on the keyboard beginning with the highest digit and continuing down to the last significant digit. In such type of machine, if the last significant digit is not of the units order, the intervening zeros will be printed by the machine, and do not have to be set up by keys. Therefore, in order to set up the multi-digit number 1,000,000, only the "1" key of the millions denominational order must be operated. In such type of machine constructed according to this invention, the "1" key is operated its full extent against the added resistance, both to set up the control for the entry of the amount and to initiate the cycle of machine operation in which such amount is entered into the machine. As another example, if the number 590 is to be entered into the machine, the "5" key in the hundreds denominational order is operated to the set position and the "9" key in the tens order is given the full operational movement inwardly, which sets the machine in operation and enters the number 590 into the machine. If the number 10,000,001 is to be entered into the machine, the "1" key of the ten millions order is operated to the set position and the "1" key of the units order is given its full movement, which enters the number 10,000,001 into the machine with but the operation of two amount keys and without the use of any auxiliary key or motor bar.

The keys are mounted in denominational rows on the keyboard, and each may be pushed inwardly, by the operator's finger or otherwise, against the action of a restoring spring, the first part of the movement inwardly being resisted only by the action of said restoring spring to a place where the operator senses a stronger resistance against the inward movement. At this point the key has become latched and the key stem, extending inwardly into the machine, is in position to control the data-entering mechanism according to the value represented by said digit key. The operator may then push the key slightly further in against a stiffer spring resistance, as a second spring, common to all of the keys in the machine, comes into action. The added resistance on further inward movement of the key beyond the latching point is the same for all the digit keys, a common spring being the source of said resistance.

In ordinary single operations of adding or substracting, the cycle-initiating key is released by the operator from its innermost cycle initiating position as soon as the machine cycle has started, the key returning to the set position, in which it is held until near the end of the machine cycle when it is restored to normal.

As is ordinarily the case in such calculating machines, which are controlled by keys which are preset to represent the data to be entered, the keys are restored to normal unless otherwise restrained through the operator's fingers or by a "repeat" mechanism in which the key-restoring function is disabled. As has been said it is possible also to hold any combination of keys down and have the machine recycle a selected number of times, thus, in effect performing a multiplying operation, by successive addition, wherein the data represented by the keys held down is the multiplicand, and the number of cycles represents the multiplier.

If the multiplier is a multi-digit number, the multiplicand may be set up again, with a denominational shift in either direction, depending upon which way the multiplication is to proceed, and the multiplicand is entered in the new positions the required number of times. The fact that the operator has his finger pattern assumed for entering the multiplicand in one denominational position of multiplication allows him to shift to the next denominational position of multiplication without changing the assumed position of his fingers, as may be done with key-driven calculating machines.

The machine is equipped with a "repeat" control for holding the keys in latched position at the end of a cycle. At the end of the first entry cycle a further entry of the same amount may be effectuated by operation of a held-down digit key or, the operation of the motor bar.

The machine is equipped with subtraction control means, in the form of a "subtract" key, which may be used to condition the machine so that cycle of operation initiated by the digit keys results in the subtractive entry of the key-selected amount, or the construction can be arranged so that the subtract entries are set up on the keyboard and the cycle initiation is effected by pressing the "subtract" key, which also sets up control mechanism to cause the amount set up on the keyboard to be entered into the machine subtractively instead of additively.

The fact that the digit-representing keys can be used either for the single function of setting up the selected data to be entered into the machine or alternatively used to both set up data to be entered into the machine and to initiate machine cycles, makes a machine constructed according to this invention extremely flexible and fast in operation. It will be understood from the description to follow that the novel mechanism in no way interferes with the operation of the machine by use of a conventional motor bar.

The invention utilizes a solenoid which, when energized by digit key operation to the second stage, that is to say, beyond the point of added resistance, causes the initiation of a machine cycle. Special safety controls are provided to deenergize the solenoid during the middle of a machine cycle.

While the invention has been shown embodied in the Allen-Wales type of calculating machine, it will become obvious, as the construction of the novel mechanism is explained in the specification, that the principle is applicable to all key-set adding machines of the full keyboard type.

It is a principal object of this invention to provide a flexible full keyboard power-operated calculating machine in which data-entering cycles of operation of the machine are initiated by special operations of any digit key.

It is another object of this invention to provide such a machine in which the keys may be operated one at a time to set up on the keyboard an amount to be entered, either a single or multiple digit amount, and in which the last key movement initiates a cycle of machine operation in which the amount is entered into the machine, either additively or subtractively, as determined by the operator.

It is a further object of the invention to provide such a machine that may be conditioned to make a subtract operation before the amount of the data to be entered is set up on the keyboard.

A still further object of the invention is to provide the digit keys with special construction by which they may be latched in set condition, where they control the amount to be entered into the machine during a machine cycle, and which will let them be further operated to cause movement of elements common to all the keys, to initiate a cycle of machine operation.

A more specific object of the invention is to provide solenoid means energized by a special operation of any digit key to cause the initiation of a machine cycle.

Another object of the invention is to provide means to disable the solenoid energizing circuit and, hence the digit key cycle initiating mechanism.

The particular machine in which the invention is embodied is provided with an electric motor having a normally open energizing circuit which is closed by the cycle initiating means, said cycle initiating means also causing the coupling of the motor to the main operating means of the machine for a machine cycle. At the end of a machine cycle the motor is uncoupled from the main operating means and the motor deenergized, unless restrained from restoring by the operator or by the total control mechanism.

The novel mechanism in no way interferes with the operation of the machine by the control keys.

With the foregoing and incidental objects in view, the invention includes certain novel features of construction and combinations of parts, a preferred form or embodiment of which is hereinafter described with reference to the drawings which accompany and form a part of this specification.

Of the drawings:

Fig. 7 is a plan view, looking down upon the base of the machine, showing part of the cycle initiating means, and including, of the novel structure of this invention, the solenoid and the solenoid energizing switch and switch disabling means.

Figure 3:
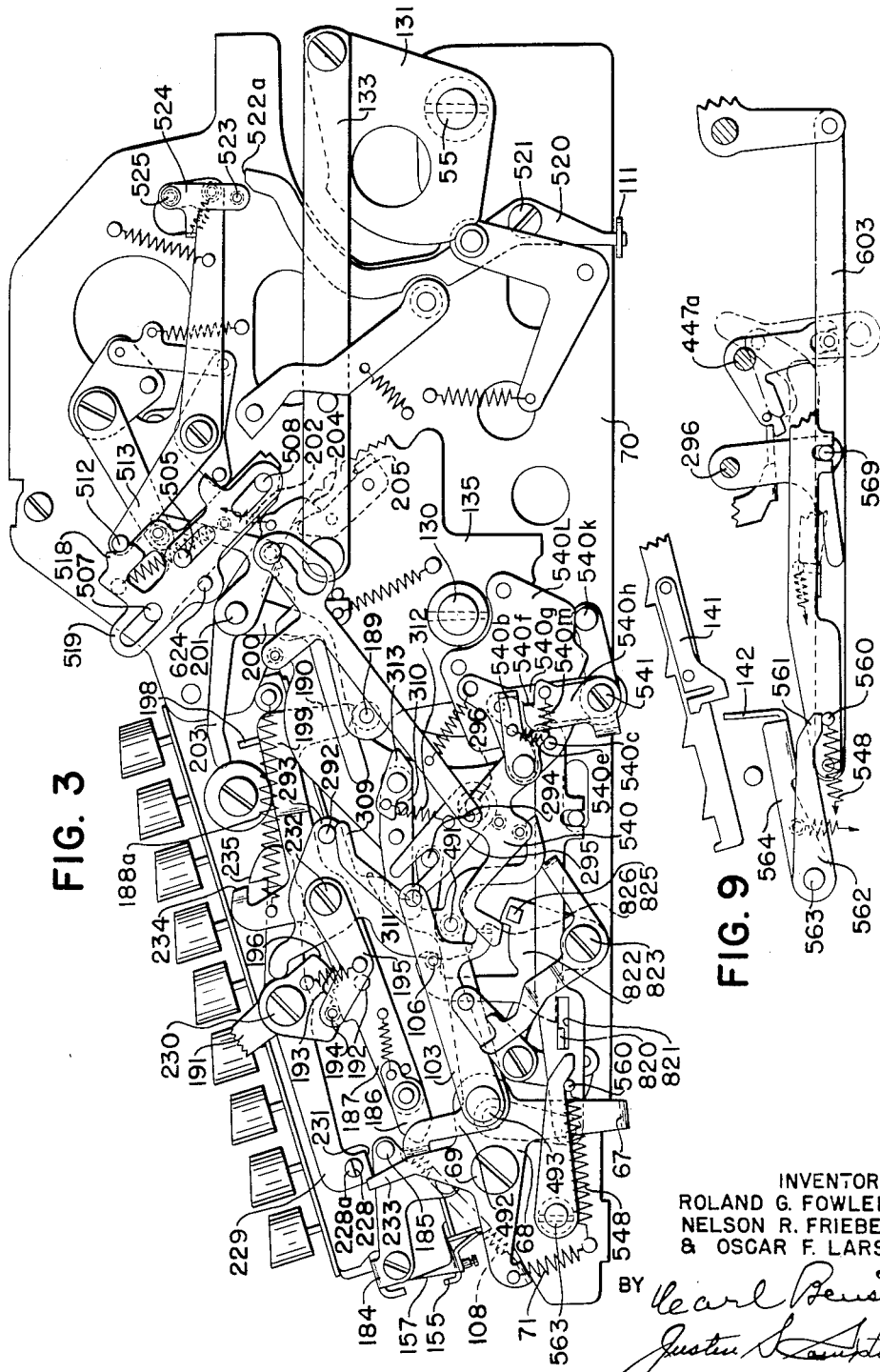
Fig. 3 is an elevation of the right side mechanism of the machine, with particular reference to that part of the mechanism which is on the outside of the right vertical frame plate.

Fig. 9, on the sheet containing Fig. 3, shows the mechanism for holding the differential racks from movement during the first cycle of a total-taking operation.

Figure 4:
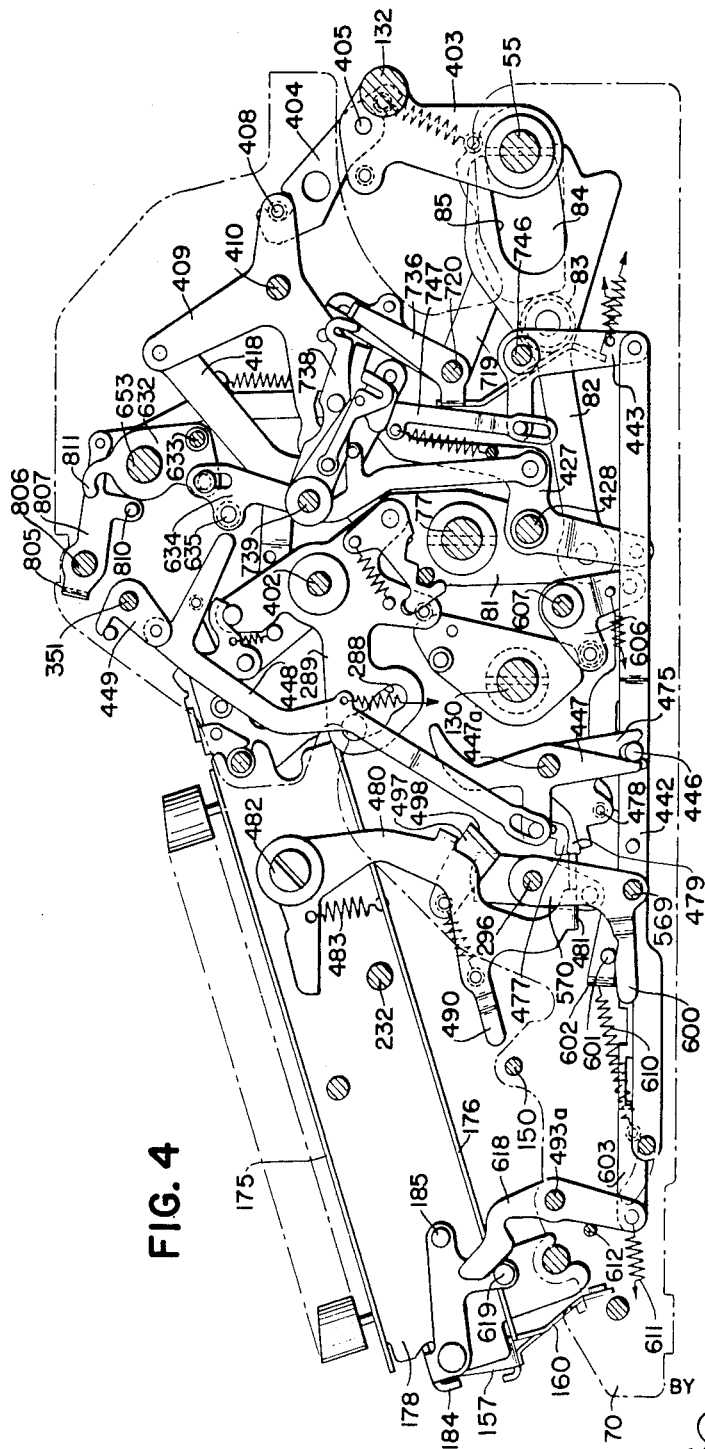
Fig. 4 is a side elevation of that portion of the right side control mechanism which mainly is located on the inside of the right frame plate of the machine.
Figure 10:
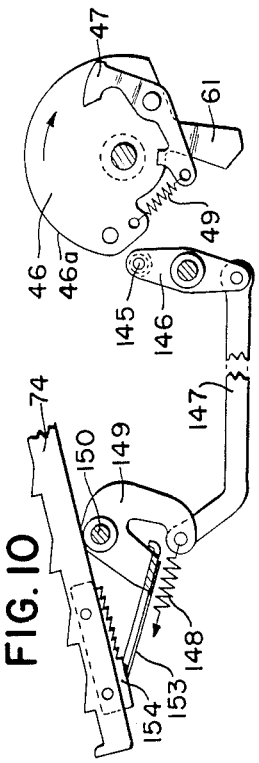

Fig. 10, on the sheet containing Fig. 4, shows the anti-rebound mechanism of a typical differential order.

Figure 5:
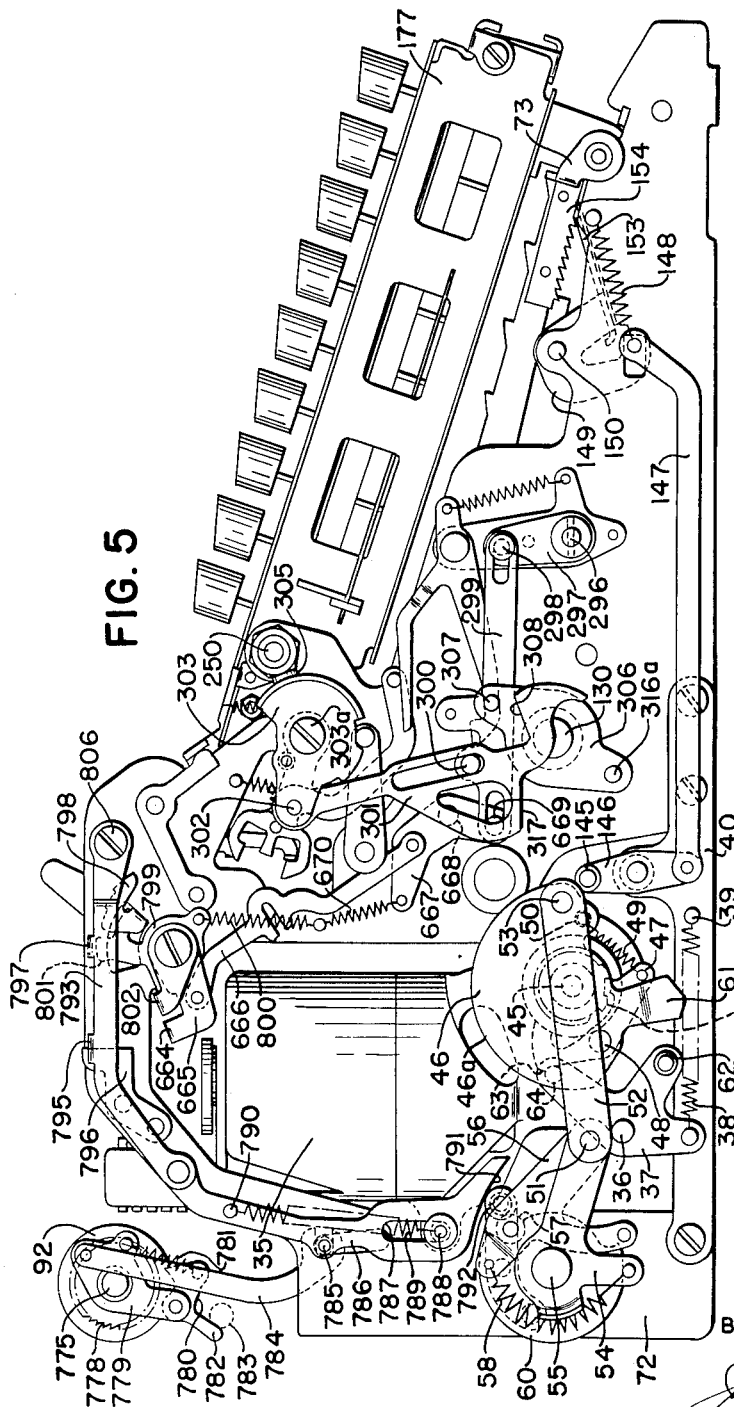
Fig. 5 is an elevation of the left side mechanism as viewed from the outside of the left vertical frame plate.
Figure 11:
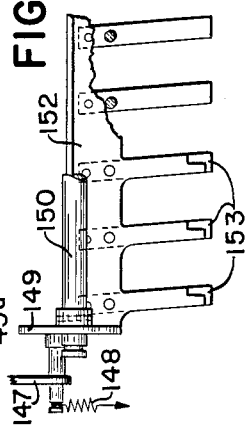

Fig. 11, on the sheet containing Fig. 5, is a plan view of the left end of the comb of the anti-rebound mechanism of Fig. 10.

Fig. 12 is a plan view of the totalizer wheels and shiftable frame, and their relation to the differential racks.

Figs. 13 and 14, show respectively, the subtracting and adding positions of the totalizer elements of a typical denominational order with respect to the associated differential rack and transfer lever.

Fig. 15 is a right end view of the mechanism by which the totalizer wheels are held immobile while out of mesh with the differential racks.

Figs. 16 and 17 show part of the printing ink-ribbon shifting mechanism as viewed from the right side.

Fig. 18 shows the train of mechanism, including the subtract key, for causing a subtract operation.

Fig. 19 is a detail of the "fugitive 1" entry control mechanism, looking toward the left, after a subtract operation and just prior to the totalizer passing from a positive condition to a negative condition.

Fig. 20 shows the substance of Fig. 19 with an added showing of the indicator drum and totalizer add and subtract pinions, and with the "fugitive 1" control mechanism as it is after an addition has been made to a positive total.

Fig. 21 is a broken perspective view of a typical totalizer wheel with pinion and transfer pawl teeth.

Fig. 22 shows the substance of Fig. 19 after a negative total has been taken from the totalizer.

Fig. 23 shows a partly exploded perspective view of the mechanism by which the selective shifting of the totalizer is effected on total-taking operations, under control of the negative or positive condition of the totalizer.

Fig. 24 is a partly exploded perspective view of a typical differential rack and the means for entering the "fugitive 1" in the units order under control of the highest order transfer lever.

Fig. 25, on the sheet containing Fig. 7, is a right side view of the motor energizing circuit switch with the machine cycle control latching mechanism.

Fig. 26 is a diagrammatic showing of the relative position of the transfer pawl piece, number drum, sight aperture, and transfer lever associated with the totalizer pinion of a typical denominational order.

Fig. 27 is a view of part of the totalizer engaging mechanism and the associated total-taking controls therefor, as seen from the right.

Fig. 28 shows the sub-total key mechanism and its relation to the substance of Fig. 27.

Fig. 29 shows part of the mechanism of Fig. 28 at the middle of the second cycle of a sub-total operation.

Fig. 30 is an elevation of the add motor bar and total control key with relation to the machine cycle initiating mechanism associated therewith.

Fig. 31 is a view of the non-add operation control mechanism.

Fig. 32 shows the mechanism for setting the symbol-printing type bar in accordance with the type of machine operation.

Fig. 33 is a detail of the ribbon support frame and the linkage whereby its movement in negative entry operations or negative total operations controls the symbol-printing type bar position.

Fig. 34 shows the mechanism of Fig. 33 moved from a "positive" position to a "negative" position.

Fig. 35 is a detail of a portion of the substance of Fig. 32 as positioned in sub-total operations.

Fig. 36 is a right side view, partially in section, through a typical digit key bank with no keys depressed, showing the slide plate by which the solenoid energizing switch is closed upon the complete downward movement of a digit key.

Fig. 37 is a plan view of the left end of the bail moved by the slide plates of the various denominational key bank rows, for closing the solenoid energizing switch.

Fig. 38 is a circuit diagram of the solenoid energizing elements, super-imposed upon a plan view of the solenoid, the key-operated solenoid energizing switch, the master control switch and the disabling means, in the normal position of rest.

Fig. 39 is a perspective view of the front end portion of a typical key-operated slide, the front two keys of a typical digit key row, and the front end of the latch plate for the digit keys of said row, the "2" key being in latched position and the "1" key being in normal un-operated position.

Figure 1:
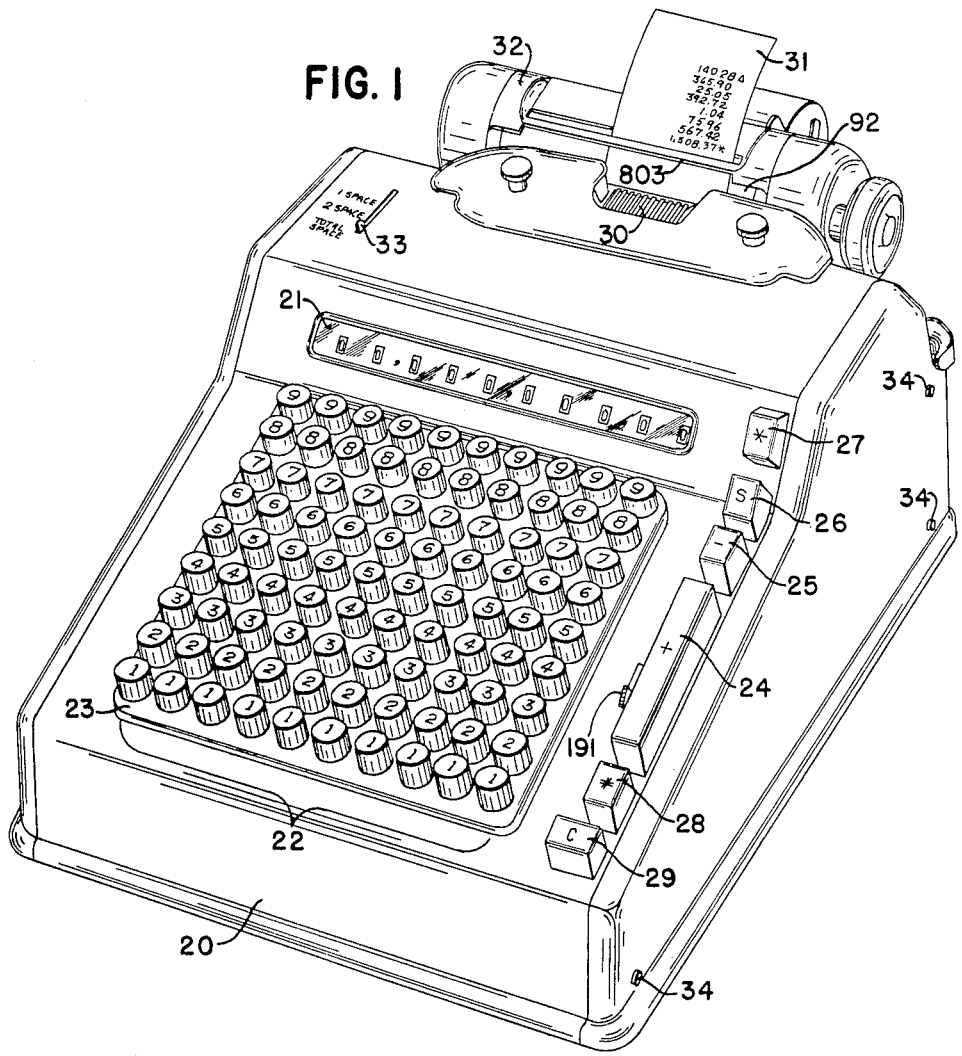
Fig. 1 is a perspective view of the machine embodying the invention, particularly showing the externally apparent features of the digit keyboard, the control keys and the printing mechanism.
Figure 40:
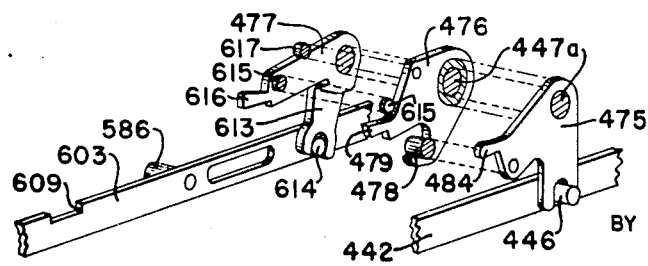

Fig. 40, on the same sheet containing Fig. 1, is an exploded view of the latch mechanism for controlling the tripping of the machine on non-add operations and for controlling the two machine cycles of total and sub-total operations.

Fig. 41 is a top plan view of the printer and adjoining parts of the machine, certain parts being omitted.

Figure 6:
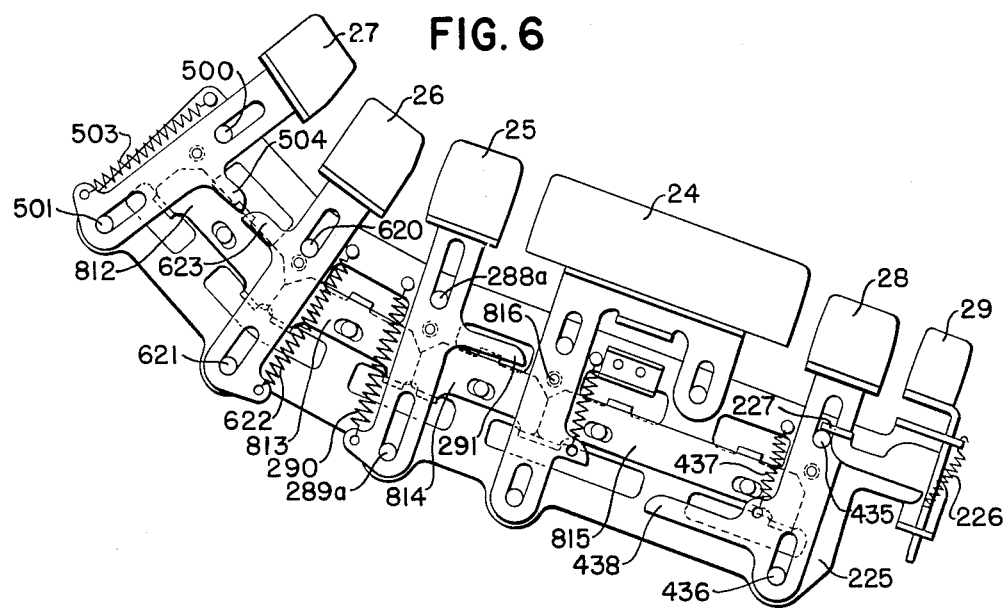
Fig. 6 is an elevation of the control key mechanism which is secured to the inner right side of the cabinet, looking toward the right.
Figure 42:
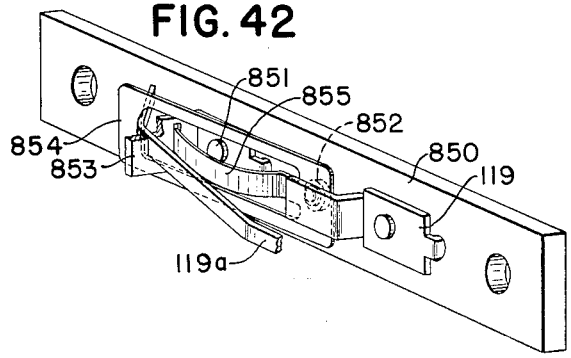

Fig. 42, on the same sheet containing Figs. 6 and 7, is an enlarged perspective view of the solenoid energizing switch.

General description

The machine is housed in a casing 20 (Fig. 1) having a viewing aperture 21, covered by glass, through which the periphery of number drums attached to the totalizer pinions may be seen. There are ten denominational orders of digit-representing keys 22, projecting through a dust plate 23 in the casing. Items to be added are set up on the keyboard by pressing in on keys 22 until added resistance is felt and the machine is set in operation by pressing the last selected digit key beyond the point of added resistance. A machine operation may also be initiated by pressing motor bar 24 if an add operation is desired, or by pressing the subtract control key 25, if a subtract operation is desired.

In a modified form of the invention the subtract key is used to condition the machine to subtract, the amount to be subtracted is set up on the keyboard, and the machine cycle thereafter is initiated by pressing the last used digit key beyond the point of added resistance. If a total operation is desired key 27 is depressed. If a sub-total operation is desired, key 26 is depressed. Key 28 is a non-add control, depression of which causes the printing of any number set up on the keyboard without the entering of it into the totalizer. Key 29 is a correction control used to release any depressed digit keys. A set of type bars 30 prints items, totals, and symbols, on a record tape 31, held on platen 92 in the paper carriage 32. The lever 33 is adjusted to single-space, double-space, or total-space position to control the extent of paper feed.

The machine takes and prints true negative totals, as well as positive totals by use of the total control keys, and prints positive and negative entries.

The casing is secured to the machine framework by screws 34.

Machine drive

The machine is driven by an electric motor 35 (Fig. 5) through one cycle of operation on add and subtract operations, and through two cycles of operation on total-taking or sub-total-taking operations, as controlled by cycle initiating tripping mechanism and single cycle clutch mechanism, to be described. One machine cycle consists of the rocking of shaft 55 first clockwise for the first half and then counter-clockwise to complete it. In two-cycle operations the tripping mechanism is kept from re-latching at the end of the first cycle, as will be explained. When the machine cycle is initiated the normally open switch 41 (Fig. 25) is closed by ear 42 on lever 43 turned counter-clockwise by stud 43a on bell crank lever 109 by the turning of shaft 36 (see also Fig. 5) on which it is secured. Three-armed lever 37 secured to the outer end of shaft 36 is rocked by the action of spring 38 anchored to it and to the machine framework by stud 39 on plate 40, screwed to the left vertical side frame plate 72.

The ear 42 (Fig. 25) is caught by spring-urged latch pawl 44, to hold the motor switch closed until the close of the machine cycle when latch 44 is lifted by nose 44a of a plate secured to shaft 55, allowing the switch blades to spring open. At this time lever 37 has reset and lever 43 is moved against stud 43a. Normally shaft 36 is held by spring 38 in the position shown in Fig. 25 when the motor switch is open, by trip-latch 104 engaging the ear 105 on the rearwardly extending arm of bell crank lever 109. The trip-latch 104 is rocked clockwise, as shown in Fig. 25, to start the machine cycle, such rocking being done by the end 110 of lever 111 (see also Fig. 7) pivoted to the machine base 112 by pivot stud 113. Lever 111 is rocked counter-clockwise to initiate a machine cycle, and such rocking is done by solenoid 114 under digit key control, or is rocked by link 65 being pulled forwardly by the control keys, as will be explained. Referring to Fig. 5, as the motor 35 runs, it turns the shaft 45 counterclockwise through reduction gearing, not shown. Shaft 45 has a notched drive wheel 45a secured thereto behind crank plate 46 which is loosely mounted on the shaft. Drive pawl 47, pivotally mounted on plate 46 by stud 48, is urged in an engaging direction toward the notched drive wheel by spring 49 anchored to the pawl and to stud 50 on plate 46, but is disengaged therefrom when the machine comes to rest by reason of stud 64 on lever 37 bearing against surface 63 on the rearwardly extending arm of pawl 47. However, as soon as lever 37 rocks counter-clockwise, when the latch 104 is tripped, and the motor starts, pawl 47 is released and engages the notched drive wheel 45a, rotating crank plate 46 counter-clockwise in the direction of the arrow. Shaft 55 has loosely mounted thereon a crank 54 connected to plate 46 by a pivot stud 51, connecting link 52 and pivot stud 53. Crank 54 is coupled to the main drive shaft 55 by a yielding driving connection, including lever 56 pivoted on stud 51, and a roller 57 mounted on the outer end of the lever 56. The roller is urged by a strong spring 58 into a notch in the edge of a plate 60 secured to shaft 55. Spring 58 is strong enough to hold roller 57 in the notch to form a driving connection between crank 54 and shaft 55 during all normal operations of the machine. The driving connection will yield, however, to any overload placed on the main drive shaft. As plate 46 is about to complete a rotation, a cam arm 61, secured thereto, strikes roller stud 62 on lever 37, rocking lever 37 clockwise to normal position in which position it is latched in single-cycle operations by trip latch 104 (Fig. 25) urged counter-clockwise by lever 111, and link 65 (Fig. 7) pivoted at its forward end to the downwardly extending arm 67 (see also Fig. 3) of four-armed lever 68, pivotally mounted on screw stud 69 mounted in right frame plate 70 and urged counter-clockwise by spring 71. As plate 46 (Fig. 5) nears home position, pawl 47 is rocked clockwise on stud 48, as surface 63 strikes stud 64. On two-cycle operations lever 37 is not latched by trip latch 104 in normal position at the end of one cycle, after it is rocked clockwise by arm 61, but immediately returns to its counter-clockwise position before it has a chance to disengage pawl 47. On total-taking and sub-total-taking operations the lever 37 is latched by trip latch 104 in normal position after two cycles of operation.

Whenever lever 37 and shaft 36 move to and are latched in normal position, the motor switch contacts are permitted to open, allowing the motor to coast to a stop, disconnected from crank plate 46.

Rocking four-armed lever 68 (Fig. 3) slightly clockwise by operation control key mechanisms on the right side of the machine, from the normal position shown in Fig. 3, against the counter-urge of spring 71, will set the machine to cycling and it will continue to do so until four-armed lever 68 is returned to normal position.

On add operations, under control of motor bar 24, lever 103 is rocked down, and stud 106 thereon, in turn, rocks bell crank 492 mounted on stud 493, held by lever 68, clockwise, carrying with it lever 68 to which it is coupled by spring 108. Lever 68 is also rocked by the total-taking, sub-total-taking, non-add and subtract key mechanisms of the preferred embodiment, as will be described.

The drive shaft 55 extends across the rear end of the machine and, as seen in Fig. 3, in one machine cycle rocks first counter-clockwise and then clockwise to actuate the differential, control mechanisms and printer.

The differential

Figure 2:
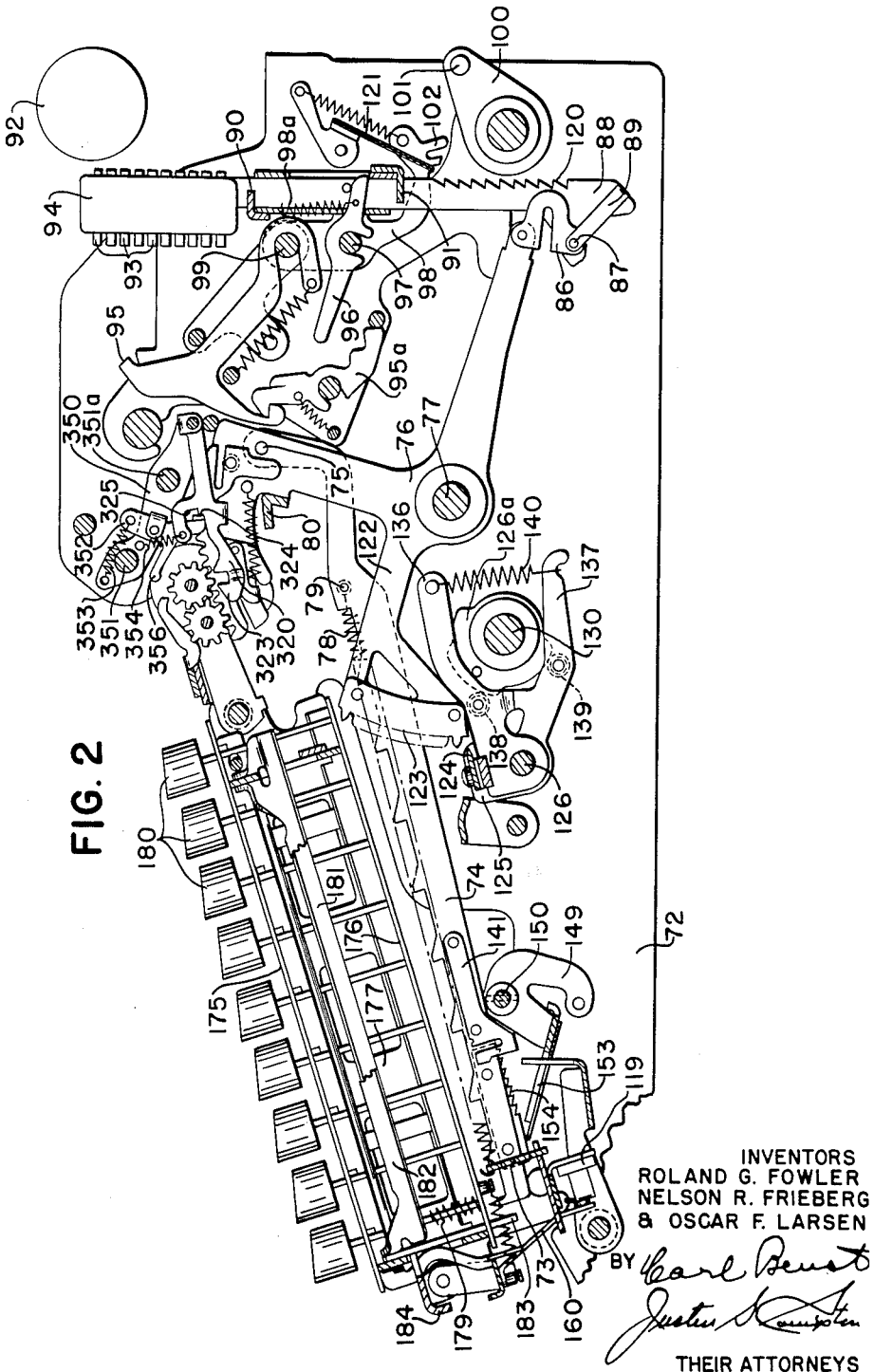
Fig. 2 is a vertical section, from front to rear, through the machine, to the right of a digit key bank, showing the main features of the key bank, a portion of the novel cycle initiating control mechanism operated thereby, the principal portions of the associated differential and totalizer, the printing mechanism and certain alining mechanism.

Secured between the front end of the right vertical side plate 70 (Figs. 3 and 4) and the front end of the left vertical side frame plate 72 (Figs. 2 and 5) is a slotted plate or comb 73 (Figs. 2 and 5) in which the front ends of a series of denominational order stop bars are guided and supported for sliding movement. There is one stop bar for each denominational order. As the stop bars of all orders are constructed the same, a typical order only is shown in Fig. 2, as an example. Stop bar 74 is pivoted at the rear end by stud 75 to the upper extending arm of a three-armed diverging lever 76 pivotally mounted on shaft 77, and is normally urged forwardly by spring 78 stretched between a stud 79 and comb 73. The stop bar normally is held against forward movement by a bail 80, extending across the front of all of the diverging levers and held between two arms pinned to shaft 77. The right arm 81 (Fig. 4) has a downwardly extending arm pivoted to a link 82 having rotatably mounted thereon a roller 83, which is held in engagement with the edge of a cam 84 pinned to drive shaft 55. The rear end of link 82 has a forked end 85, which embraces and rides the shaft 55 for support. As the shaft 55 rocks counter-clockwise, shaft 77, therefore, will do likewise, causing a forward and downward movement of bail 80 by reason of the urge given by the springs, like spring 78 (Fig. 2), urging the stop bars forward. On return movement of the bail 80, on the clockwise movement of shaft 55, the stop bars will be returned to the rest position of Fig. 2. A rearwardly extending arm of diverging lever 76 is pivoted to one end of a U-shaped adjusting link 86, the other end of which is pivoted on a stud 87 of a printer bar 88, where it is retained by a spring clip 89. The printer bar 88 is adjusted vertically in slotted guides 90 and 91, with respect to the paper platen 92, shown diagrammatically, according to the selected positioning of the diverging lever 76, under control of the digit keys to be described. Printer bar 88 has, at the top end, ten vertically spaced type 93 movable individually, in a case 94, toward the paper platen when positioned to print. The type are urged to the retracted position, by springs within case 94, and the particular type in printing position is hit by the printing hammer 95, when released from the cocked position, at printing time, by the tripping of a latch 95a. When a type bar is selectively raised to printing position, an interponent 96 rocks counter-clockwise on bail 97 under urge of spring 98a.

Bail 97 is secured between arm 98 pivoted on shaft 99 and another arm like arm 98, also pivoted on shaft 99. Bail 97 extends across the printer. Cam lever 100 on shaft 55 is rocked counter-clockwise and then clockwise during machine operation, but stud 101 thereon strikes the tail 102 on arm 98, rocking the bail and interponent 96 toward latch 95a, which thereby is unlatched at mid-cycle if the printing bar 88 has been moved from home position so as to render interponent 96 effective, causing the printing hammer 95 to hit the type which is positioned at the printing point.

The described printing mechanism is duplicated in each denominational order except that the rearwardly extending arms of the three-armed diverging levers, like the lever 76, in order to connect to the associated printer bars, which are crowded together as shown in Fig. 1, instead of being in line with the respective key bank denominations, are bent according to the relative lateral position between a stop bar and its associated printing bar.

The printing mechanism described is old in principle, being disclosed in the Peters United States Patent 1,386,021. The lower end of each printing bar has a series of notches 120 adapted to be engaged by a bail 121, on total-taking operations, after printing and before disengagement of the totalizer from the differential, to prevent slamming of the differential to full operated condition. As such mechanism does not constitute a part of the invention, the operating and timing mechanism for this bar has not been shown.

The forwardly projecting arm 122 of diverging lever 76 has mounted thereon an alining rack 123, the ten teeth of which pass in front of an alining bail 124, serving all denominational orders, which bail is rocked toward the rack 123 during the middle part of a machine cycle, just before totalizer engaging time, to hold the diverging lever 76 rigidly in set position. The alining bail 124 is held in a rockable frame, including two side arms, the left one of which 125 is shown, and a bail support rod 126 connected to said side arms. The side arms are pivotally mounted on studs mounted on the inside of the vertical side plates 70 and 72. The alining bar assembly is rocked by cam 126a secured on cross shaft 130 journaled in side plates 70 and 72 and rocked counter-clockwise, then clockwise by the drive shaft 55 (Fig. 3) through plate 131, link 133 pivoted thereto, and plate 135 secured on said cross shaft 130. Returning to Fig. 2, scissor arms 136 and 137, pivotally mounted on cross bar 126, have studs 138 and 139, respectively, which are kept in contact with the edge of cam 126a by spring 140. The alining bar is set in the scissor arm 136 which, when rocked, rocks the alining bar and supporting frame assembly. The cam 126 is so formed as to bring the alining bar into the rack 123 shortly before mid-cycle, as the totalizer comes into engagement with the differential racks on the diverging levers, to be described. The alining bar holds the racks in perfect adjustment insuring proper meshing of the teeth with the totalizer pinions.

On the side of stop bar 74 is an adjustable stop plate 141, the forward end of which strikes comb 73, to limit the forward movement of the stop bar. Referring to Fig. 9, stop plate 141 is engaged by a bail 142, during the first cycle of total-taking and sub-total-taking operations, to hold the differential from movement, as will be described later in connection with the total-taking mechanism.

Referring to Fig. 10, plate 46 on the motor shaft (see also Fig. 5) has a cam edge, the high portion 46a of which is adapted to bear against the roller stud 145 of rocker lever 146 pivoted on plate 40, and said rocker lever 146 has pivoted to its other end link 147, which is urged forwardly by spring 148 (also see Fig. 11). The forward end of link 147 is pivoted to bell crank lever 149 secured on shaft 150, extending between and journaled in side frame plates 70 and 72. The downwardly and forwardly extending arm of bell crank lever 149 is the left support of a comb-like bail 152, having a spring blade 153 for each differential stop bar. The right end of bail 152 is secured to another arm secured on shaft 150 to the left of right side plate 70. As motor shaft driven plate 46 is positioned normally, as shown in Fig. 3, cam edge 46a of plate 46 does not touch roller stud 145 and the teeth of bail 152 are held against associate tooth plates 154 attached to the stop bars by spring 148. The teeth of plates 154 are pointed rearwardly. On forward movement of the stop bars in a machine cycle, the teeth of plates 154 click over the blades, which act to prevent rebounding of the stop bars as they are stopped in their setting movement. Thereafter the high portion 46a of the plate 46 engages roller stud 145, pulling link 147 rearwardly and releasing the spring blades from engagement with the tooth plates 154, so the stop bars may return to home position during the last half of a machine cycle.

*The digit keyboard*

The keyboard, in which the digit keys for controlling the movement of the differentials are mounted, has a main frame including a top plate 175 (Fig. 2), a bottom plate 176, a left side plate 177 (see Fig. 5), and a right side plate 178 (see Fig. 4).

A typical denominational keybank row is shown in Fig. 2. The keys 180 have key stems slidably mounted in alined slots cut in the top and bottom plates and are normally held up in ineffective position by springs such as spring 179. Any depressed key has its key stem projecting below bottom plate 176 and is adapted to be struck by an associated one of teeth on stop bar 74 as it moves forward on the first half of an entry machine cycle. The extent of movement of stop bar 74 is proportional to the digit value of the key depressed. Each keybank has a zero stop bail 182 and a latching bail 181 (see also Fig. 39). When a key in the bank is depressed zero stop bail 182 is rocked to move a zero stop member 183 from a position in which it blocks any significant movement of the stop bar except that sufficient to move the associated printing bar to zero printing position. The lower edge of a bail 181 is spring-urged toward the left edges of the keys in the row and latches any depressed key in depressed condition by engaging a shoulder 131a thereon until unlatched by the outward rocking of bail 181 by depression of another key in the bank or by rocking of the key release bail 184 as stud 185 (Figs. 3 and 4) is struck downwardly by by-pass pawl 186 (Fig. 3). By-pass pawl 186 is pivoted on lever 187 which is rocked clockwise on pivot 232, during the first half of a machine cycle, when pawl 186 by-passes stud 185, and counter-clockwise, during the second half of a machine cycle, when pawl 186 knocks stud 185 downwardly releasing the keys. Spring 188a normally urges lever 187 clockwise and its rocking excursion clockwise from the home position is permitted when roller stud 189 on plate 135 is moved from under its rearwardly and downwardly extending leg 190 during the first half of a machine cycle. Stud 189 rocks back to home position, shown, at the end of a machine cycle at which time the keys are released, except on repeat operations wherein repeat lever 191 is rocked clockwise. In the normal position of repeat lever 191 stud 192 on lever 187 is free to move upwardly into notch 193 in lever 191 thus giving said lever 187 sufficient movement so that by-pass pawl 186 passes stud 185. If lever 191 is rocked clockwise stud 194 on retaining pawl 195 normally in engagement in a front notch of lever 191 engages the rear notch 193 thereof, at which position edge 196 of lever 191 blocks movement of stud 192 and consequently the key release actuating lever 187 is not rocked by spring 188a during a machine cycle. A locking bar 198 extends across the rear ends of all the keybanks and is resiliently urged toward the right, such movement locking the digit keys from movement whether in normal or depressed position, and such outward movement occurs when the tail 199 on key release actuating lever 187 moves from home position at the beginning of a machine operation. Return movement of lever 187 at the end of a machine operation forces locking bar 198 to inward position to permit selective depression of the digit keys for the next operation. In repeat operations there is sufficient clearance between edge 196 of lever 191 and stud 192 to permit lever 187 to rock clockwise a sufficient amount to lock the keys. To insure key locking bar 198 has functioned properly, a three-armed interlock lever 200 pivoted on stud 201 is urged counter-clockwise by a spring 202 acting on a rearwardly extending one of the three arms to hold the downwardly and forwardly extending arm against stud 189 in plate 135. In the home position of plate 135 the forward and upwardly extending arm 203 is above locking bar 198, but as soon as plate 135 rocks counter-clockwise in the first half of a machine cycle stud 189 becomes ineffective and allows arm 203 to drop toward locking bar 198 which is then moving outwardly as lever 187 rocks clockwise. Arm 203 continuing movement enters a notch in extended locking bar 198 to hold it in locking position during the remainder of the machine operation until stud 189 comes back to home position. In the event locking bar 198 fails to move outwardly, arm 203 does not complete its movement and the machine action is blocked by toe 204 engaging a formation 205 on a stop plate secured to the inside surface of plate 135. The action of arm 203 occurs every cycle of operation so an undepressed key cannot be depressed during a movement of the stop bars.

A manually operated key release is provided for releasing any depressed key except during a machine cycle and between cycles of a two-cycle operation. Correction key 29 (Fig. 6) slidably mounted inside the machine casing in alined slots in bent-over ears of bracket 225 normally is kept in the up position by spring 226 but may be depressed against its restoring action. A rearwardly extending arm thereof has a bent-over ear 227 which, when the casing is on the machine, is directly above a flattened surface 228 (Fig. 3) on a stud 228a projecting from the front end of a lever 229 pivoted on screw stud 230. Counterclockwise rocking of lever 229 by key 29 causes surface 231 thereof to strike stud 185 rocking bail 184 thus releasing the depressed digit keys. Lever 229 normally is held with a surface on a rearwardly extending arm thereof resting on screw stud 232, by means of a spring, not shown. Rocking of lever 68 clockwise upon release of the machine for motor operation places arm 233 thereof under stud 228a preventing key-release movement of lever 229. Bent-over hook 234 on lever 187 rides over surface 235 on the rearwardly extending arm of key release lever 229 to prevent its movement when the machine is operated by a crank rocking shaft 130 without rocking of motor release lever 68.

Reference is made to United States patent to Schroder 2,062,731 and to United States patent to Lambert 2,389,062 for a more detailed description of foregoing features of the digit key bank construction, the description given herein being sufficient for an understanding of the novel features next to be described.

*Digit key mechanism for initiating a machine cycle*

Referring first to Figs. 36, 37 and 39, there is provided for each denominational key row a slide plate 59 extending through vertical slots 66 in the key stems, said slide plates being limited in forward and backward movement by the dimensions of a slot 132 in the rear end of each, through which slots a rod 134, fastened in the keyboard side plates, extends. As shown in Fig. 39, each slide, like slide 59, rests in the bottom of the slots 66 of the undepressed keys and has at the forward end a downwardly extending curved finger 143. The slides are resiliently held in their rear-most positions by a bail 155 supported by arms 156 and 157 (see also Fig. 3) pivoted on studs held in the side plates of the keyboard. This bail is held against the downwardly extending fingers 143 of the slide plates by an adjustable spring 158 extending between the bail and an adjustable bolt on the bottom plate of the keyboard. Spring 158 may be adjusted in tension by moving adjustable bolt 158a back and forth in slot 158b. Each slide has a bevelled notch in its top edge for each associated key so that when a key is depressed beyond its latching point the top edge of the clearance slot 66 in the key stem engages the bevelled portion of the associated notch causing the slide plate to move forward slightly. Spring 158 gives resistance to this slide plate action so that the operator can set up an amount on the keyboard without causing the corresponding slides to move forward, the extra resistance encountered as the top of the clearance slots in the slides make contact with the slide plates giving him adequate warning. The spring tension 158 is generally calibrated with such point in view, but is further adjustable as described. As the last key is set up for a given entry the operator depresses the key further, against the added resistance furnished by spring 158, to move the associated slide. This rocks bail 155 (Fig. 36) clockwise so that a depending tail 160 thereof operates the switch, next to be described, for energizing solenoid 114 (Fig. 38) to trip the latch 104 (see also Fig. 25) initiating a cycle of machine operation.

Referring to Fig. 38 the movable core of solenoid 114 has a forked end 115 embracing the left end of lever 111 and is locked in such embracement by pin 116. The core is normally extended so that energization of the coil draws the core forward, rocking lever 111, tripping the latch and thus causes the initiation of a machine cycle. The solenoid circuit supply terminals 117 are connected to a circuit including the coil of solenoid 114, a cut-out switch 118 which may be closed to condition for operation the novel digit-key actuated machine cycle initiating circuit and mechanism, and a digit-key controlled switch 119, common to all the digit keys, normally held open by depending tail 160 of bail 155 holding in lever 119a when the bail 155 is in normal position due to no digit keys being operated. As a digit key is operated, tail 160 moves forward releasing lever 119a allowing the switch 119 to close, completing the solenoid energizing circuit and initiating a machine cycle by rocking lever 111. As lever 111 is rocked, link 111a, pivoted thereto, is moved forward, in the direction of the arrow (Fig. 38) rocking counter-clockwise a lever 111b pivoted to the front end of the base frame 112 (see Fig. 7) so that an ear 111c thereof presses against lever 119a opening the switch 119 deenergizing the solenoid 114. The switch stays open until the trip latch 104 is restored at the end of the machine cycle whereupon lever 111, link 111a and lever 111b resume their normal position. By this time the operated digit keys have restored so that tail 160 of bail 155 continues holding switch 119 open to prevent an unwanted recycling of the machine. When the machine is cycled by the add motor bar 24 or the subtract control key 26, and during total-taking operations or sub-total-taking operations, lever 111b is rocked because lever 111 is rocked, but as switch 119a already is held open by tail 160 such rocking is useless and of no effect. Across the terminals of switch 119 is a conventional spark-suppressing condenser 119b.

The switch 119, shown in enlarged form in Fig. 42, in closed condition, is of the spring toggle type and consists of an insulating support 850 supporting the two switch terminals 851 and 852 (see also Fig. 38), said terminal 851 having secured thereto an L-shaped metal bracket, the leg 853 of which standing away at right angles to the support 850 having a slot to receive the end of lever 119a which is bent downwardly to engage in a slot in metal spring switch blade 854 which thereby carries the potential of terminal 851. A curved tongue 855 of spring blade 854 bears in a notch in leg 853 and, as lever 119a is moved back and forth the switch blade makes and breaks contact with terminal 852 with a snap action.

It is seen, therefore, that the digit key cycle initiating mechanism and associated circuits may be rendered operative or inoperative according to whether main cut-out switch 118 is open or closed, and it will be shown that even though operative such does not interfere with the initiation of a machine cycle, if desired, by operation of any one of the control keys 24, 25, 26, 27 and 28 (Fig. 1).

As the keyboard is absolutely flexible, corrections may be made as to the amount set up in any denominational row by depressing the desired key to latching position which restores to normal the incorrectly depressed key. This may be done until switch 119 is closed by machine cycle initiating pressure being given the last key to be used.

*The totalizer*

Referring to Fig. 12, the totalizer is mounted in a frame including a shaft 250 journaled in bearings 251 and 252 mounted respectively in side frame plates 72 and 70, a left support arm 253, a right support arm 254, intermediate support arms 255, 256, 257, 258, 259, 260, 261, 262 and 263, and a shaft 264 extending between the rearwardly extending ends of support arms 253 and 254 and passing through support arms 255 to 263. The totalizer wheels are rotatably mounted in spaced relation on shaft 264. Each totalizer wheel (Fig. 21) has a ten-toothed pinion 265 to which is attached an indicator drum 266 bearing on its periphery ten digit numerals spaced according to the associated teeth of the pinion. On the left side of each indicator drum is a transfer pawl member having a subtract tooth 267 used in subtracting and negative total operations and an add tooth 268 spaced 36° therefrom with reference to the pinion circumference and spaced leftwardly from tooth 267 as viewed from the front of the machine, said add tooth being used in add and positive total operations.

Referring to Fig. 13, shaft 250 is shiftable leftwardly from the adding position shown, wherein toothed racks on the differentials, to be described, are in alinement with the associated pinions on the totalizer wheels, to a subtracting position in which the racks are in alinement with teeth on intermediate or idler pinions.

Taking the tens order totalizer wheel as a specific example, its pinion 275 (Figs. 12, 13 and 14) is in alinement with the tens order differential rack 276 in the adding position of the totalizer as shown in Figs. 12 and 14, whereas when the totalizer is shifted left to subtract position the rack 276 is in alinement with teeth 277 (Fig. 13) on idler pinion 278 which has another set of teeth 279, spaced therefrom by collar 280, which are in constant mesh with pinion 275.

A view of the three-armed diverging lever 76 for a typical denominational order, and which will be considered the tens order totalizer wheel, is shown in Fig. 24. The upwardly extending arm 281 has mounted thereon the toothed rack 276, the mounting being of the stud and slot type which permits of relative movement of the rack forwardly, from the normal position shown in which it is held by spring 283. Abutment 284 extends laterally from rack 276 and normally strikes an ear 285 of a transfer lever rocked by the totalizer wheel of next lower order as it passes through zero, which in the example under consideration is the units order, when such wheel approaches zero either in an adding or a subtracting direction. With the transfer lever in normal position, on return of three-armed lever 76 toward home position in the last half of a machine cycle, the rack 276 is stopped by the ear 285 one tooth step before lever 76 reaches home position. The extent of movement of the rack, carried by lever 76, toward home position, with the transfer lever of the next lower order blocking the rack, is proportional to the digit to be entered in accordance with the value of the depressed key. If the transfer lever is moved and latched in moved position, as will be described, the rack gets an extra step of movement which represents the transfer of one unit from the next lower order.

In home position of the machine the totalizer pinions always are in operative engagement with their respective racks either directly or through the idler pinions, depending on the lateral position of the totalizer frame unit as determined by the positioning of shaft 250 (Fig. 12). When the shaft is in the right position the racks are engaged directly with the totalizer wheel pinions and the collars between the sets of teeth on the idler pinions act as clearance slots for the excursions of the racks. In the left position of shaft 250 the racks are engaged with the totalizer pinions indirectly through the idler pinions.

As shown in Fig. 12, the idler pinions are mounted on studs on the support arms, idler pinion 278 of the tens bank, mounted on support arm 263, being typical.

The engagement and disengagement of the totalizer pinions with the racks is accomplished by rocking the frame consisting of support arms 253 to 263 and shaft 264 about shaft 250.

Right side support arm 254 (Figs. 12 and 27) has a downwardly extending arm 286 (Fig. 27) holding a roller stud 287 which is engaged in a cam slot 288 in a lever 289. Fig. 27 shows the position of the parts in home position in which the totalizer is in engagement with the differential racks. If the totalizer engaging lever is rocked clockwise until stud 287 is in the other end of the slot 288, the arm 254 will be rocked counter-clockwise carrying the totalizer wheel pinions out of engagement with the differential racks. It is so arranged, as will be described in connection with the description of the totalizer engaging actuating mechanism, that on item entering operations, either those of addition or subtraction, which require one machine cycle, the totalizer is disengaged during the first part of the first half of the machine cycle and re-engaged near the end of the said first half cycle. During disengagement the totalizer may be shifted laterally and the stop bars and differential racks are set to the selected positions. Other things such as transfer reset and printing occur during the totalizer disengagement. The totalizer is reengaged with the racks before the second half of the machine cycle commences and during the second half cycle the selected digit values are entered into the totalizer.

To keep the totalizer pinions from moving while out of engagement with the racks, there is a detent 240 (see Figs. 12 and 15) associated with each pinion. Detents 240 are a part of plate 241 adjustably mounted on a bail 242 having bifurcated end portions embracing shaft 250 on which it is rockable and held by spring 243 (Fig. 15) rocked clockwise until extension 244 (Fig. 12) strikes side frame plate 72 as the totalizer moves toward engagement with the racks, lifting the detents 240 from engagement with the totalizer pinions. As the totalizer pinions are disengaged from the racks the detents 240 become engaged therewith to hold the set position.

*Selection of totalizer for addition or subtraction*

Assuming the totalizer is in add position and it is desired to condition the machine for subtracting, depression of the subtract key 25 (Figs. 1, 6 and 18) slidably mounted on studs 288a and 289a mounted on bracket 225 mounted on the right inside wall of the casing, against the restoring urge of a spring 290, brings the lower edge of arm 291 into engagement with stud 292 (Fig. 18) of plate 293, mounted on screw stud 232 (Fig. 3), rocking it clockwise, causing stud 294 resting in a fork of lever 295 to rock lever 295 counter-clockwise turning shaft 296 (see also Fig. 5), to which it is pinned, in the same direction. Shaft 296 extending across the machine and journaled in side frames 70 and 72 has secured to its left end a lever 297 having a stud 298 riding in a slot in the forward end of a link 299 equipped with a stud 300 riding in a slot in lever 301 the upper end of which is pivotally connected to stud 302 on totalizer shifting cam 303 which is mounted on side frame-held stud 303a and which has a curved slot 304 (see Fig. 23) in which rides roller stud 305 (Figs. 5, 12 and 18) secured to the end of totalizer shaft 250. Depression of the subtract key 25 rocks lever 301, as seen in Fig. 5, counterclockwise. On the left end of rock shaft 130 (Fig. 5) is a plate 306 which rocks clockwise and then counter-clockwise during a machine cycle. With the machine having the parts in the position shown in Fig. 5 plate 306 accomplishes nothing during a machine circle. If the subtract key is depressed and lever 301 consequently is rocked counter-clockwise and a machine cycle commences, stud 307 engages surface 308 pulling lever 301 down, rocking cam 303 counter-clockwise shifting shaft 250 to the left to bring the totalizer into subtract position with the idler pinions in line with the differential racks. This shifting occurs just after the totalizer pinions are disengaged from the racks.

If the next machine operation is a subtract operation lever 301 being rocked counter-clockwise by link 299 (Fig. 5), remains in its down position. If the next machine operation is an addition operation stud 316a will strike surface 317 of lever 301 kicking it up to add position, as link 299 will not have been pulled forward. Whenever link 299 is pulled forward for subtract conditioning stud 316a moves ineffectively along the rear edge of lever 301 as a machine cycle is commenced.

If a subtract operation is intended the operator sets up the desired amount on the digit keys and initiates a cycle of machine operation by pressing in on the subtract key 25, the stud 292 (Fig. 3) striking the upwardly and rearwardly extending arm 309 of lever 107 rocking it and lever 68 coupled thereto to trip latch 104 (Figs. 7 and 25) through mechanically induced movement of link 65 and lever 111, without the aid of solenoid 114. Key 25 restores, as soon as the operator removes his finger therefrom, under the action of spring 290.

In a modified form of this invention, arm 309 (Fig. 3) is shortened so stud 292 will not strike it. The depression of subtract key 25 sets up the subtract condition of lever 301 (Fig. 5) which remains set, as the subtract key is restored, by the action of latch pawl 310 engaging surface 311 on lever 293. The amount desired to be entered subtractively is then set up on the keyboard and the last key is given the extra movement against the added resistance to initiate the machine cycle.

In either form of the invention lever 295 returns to normal position under the influence of spring 670 (Fig. 5), leaving the machine so lever 301 (Fig. 5) is in "add" position.

*Transfer mechanism*

Referring to Fig. 21, it will be remembered that on each totalizer wheel there is a transfer pawl tooth 268 that is associated with adding operations and positive total-taking operations. Similarly tooth 267 is associated with subtracting operations and negative total-taking operations.

Associated with each totalizer wheel adjacent its left side is a transfer lever, a typical lever 320, representing the units order, being shown in Fig. 24, rockably mounted on a shaft 321 supported by the machine framework.

This transfer lever has an outer offset portion 322 (see also Figs. 13 and 14) in line with the add tooth of the transfer pawl (see tooth 268, Fig. 21) of units ordered when the totalizer is in add position. On adding operations, as the add tooth of the totalizer pinion approaches zero position it rides on cam surface 323 (see also Fig. 2) rocking the transfer lever down where it is latched by ear 324 (see also Fig. 2), of a latch member, entering notch 325. Ear 326 (Fig. 24) is thereby taken out of alinement with the abutment of the differential rack of the tens order, allowing an additional movement of one unit to the totalizer wheel of next highest order in the manner heretofore described. On total-taking operations, where a positive total is involved vertical stop surface 327 of the offset portion of transfer lever 320 engaging the add tooth stops the associated totalizer wheel when it reaches zero position in its total-taking reverse rotary movement. Similarly, when the totalizer is shifted to the left for subtraction or the taking of negative totals, portion 328 (Figs. 13 and 14) of transfer lever 320 is in alinement with the subtract transfer pawl tooth (see tooth 267, Fig. 21) on the units totalizer pinion and in subtract entry operations it cams down on transfer lever surface 329 (Fig. 24) to cause an entry of a negative transfer unit in the tens totalizer pinion. On negative total-taking operations the subtract tooth of the units order transfer pawl stops the units totalizer pinion at zero position by striking surface 330.

The highest order transfer lever is used to enter a "fugitive one" into the lowest denominational order whenever entries cause the totalizer as a whole to pass through zero either from negative to positive or vice versa, as will be described later.

A typical transfer lever latch will be described with reference to Figs. 2 and 24. To the side of each totalizer wheel is a plate 350, supported on rods 351 and 351a secured in the side frame plates, on which is pivotally mounted a latch piece 352 urged counter-clockwise by a spring 353 and having an ear 324 (see Fig. 24), before mentioned, playing in the notch 325 of the associated transfer lever. The transfer lever is urged upwardly by spring 354. The normal position of the transfer lever is shown in Fig. 24. When the transfer lever is knocked down, or tripped, by the transfer pawl of the associated totalizer wheel, ear 324 snaps over surface 355 locking the lever in tripped position. Such tripping occurs only when the totalizer is in engagement with the differential racks. Each latch has a forwardly projecting tail 356 (Fig. 2) which is given an upward thrust, when the totalizer is brought out of engagement with the racks, by bent-over ears on the rear ends of the totalizer support arms, the ear 357 for the tens order shown in Fig. 12 being typical. Such resetting of the transfer levers occurs at the beginning of each item entering machine operation and at the beginning of the first machine cycle of a two-cycle total-taking operation of sub-total-taking operation as the totalizer comes out of engagement with the racks.

*"Fugitive one" mechanism*

When the totalizer contains a positive total, a total is taken with the totalizer in the add position and if it contains a negative total, the total is taken with the totalizer in the subtract position. A totalizer wheel, typified by the wheel of Fig. 21, when reset to zero from a positive total will be reversely rotated until the positive transfer pawl tooth 268 strikes the surface 327 (Fig. 24) of the associated transfer lever. This will show a "0" on the indicator drum through the viewing aperture 21 (Figs. 1 and 27). When the wheel of Fig. 21 is reset to zero from a negative total it is rotated in the opposite direction until the negative transfer pawl tooth 267 strikes stop surface 330 of its associated transfer lever. This will show a "9" on the indicator drum through the viewing aperture 21. Thus, after a total is taken from the totalizer under control of the positive transfer pawl teeth, that is when the totalizer is in add position, the indicator drums will show "0000000000" through the viewing aperture, whereas when a total is taken under control of the negative transfer pawl teeth, that is when the totalizer is in subtract position, the indicator drums will show "9999999999." As the drums show the actual position of the totalizer wheels, such zero positions will be referred to as "positive" zero and "negative" zero. In returning the totalizer wheels to "positive" zero or to "negative" zero the differential racks must be moved a distance equal to the true total, be is positive or negative, and such is provided for by a mechanism which insures the entry of a "fugitive one" into the totalizer as it passes during an item entry from "0000000000" to "9999999999" or from "9999999999" to "0000000000" during an item entry operation.

The following examples show the exhibited numerals of the indicator drums and hence the position of the totalizer wheels during a series of entry operations starting with the totalizer at zero.

|  | 0000000000 |
|---|---|
| Add | +1 |
|  | 0000000001 |
| subtract | −2 |
|  | 9999999999 |
| (fugitive one correction) | −1 |
|  | 9999999998 |
| add | +5 |
|  | 0000000003 |
| (fugitive one correction) | +1 |
|  | 0000000004 |

It will be seen that the "fugitive one" is added during an adding operation and subtracted during a subtracting operation.

Similar operations occur between banks during entry operations to transfer carryover data, for instance

|  | 0000000009 |
|---|---|
| add | +1 |
|  | 0000000010 | involves an entry of "one" into the tens bank in a positive sense whereas subtract
```
    0000000010
            -1
    ──────────
    0000000009
``` involves an entry of "one" into the tens bank in a negative sense.

Whereas the positioning of the totalizer in item entering is determined by the operator of the machine according to whether he depresses the "add" key 24 or the "subtract" key 25, the positioning of the totalizer in total-taking is controlled automatically according to whether the amount in the totalizer is positive or negative. If the amount of the total is positive the total will be taken by cooperation of the totalizer pinions directly with the differential racks and if the amount in the totalizer is negative the said racks will engage the totalizer pinions indirectly through the intermediate or idler pinions, such selection to be described in connection with total-taking operations.

Whenever the highest order totalizer wheel approaches the zero point from the positive side going toward the negative side or from the negative side going toward the positive side, a unit is entered into the lowest order totalizer wheel to correct for the "fugitive one."

Referring to Fig. 24, the transfer lever 360 for the highest order totalizer wheel is tripped as that wheel approaches zero from either direction and lever 361, rockably mounted on shaft 321a, which normally has latch ear 361a in the lower part of notch 362, is permitted to move so latch ear 361a moves into the upper part of notch 362 in response to the urge of spring 363, moving link 364 rearwardly to rock crank 365, pinned to shaft 366, turning shaft 366 counter-clockwise as looked at from the right side of the machine. A lever member 367, pinned to shaft 366, normally holds a yoke 368, rockably mounted on shaft 321, so that ear 369 thereof is in alinement with abutment 370 on the units order differential rack. On lever member 367 being rocked it rocks yoke 368 against the restoring action of spring 368a allowing the entry of the "fugitive one" to be made into the units order, either additively or subtractively depending on the lateral position of the totalizer. On the next machine operation yoke 368 is reset to the effective position shown in Fig. 24 by ear 370a (Fig. 12) acting on tail 371 (Fig. 24) of lever 361, in a manner similar to the resetting of the transfer latches.

Means has been provided to keep the lever 361 (Fig. 24) from rocking when the highest order wheel passes through zero except when the highest order wheel in passing through zero does it by an entry opposite in algebraic sign to the last previous entry, such means preventing the entry of a "fugitive one" when the capacity of the totalizer is exceeded positively or negatively.

Rockably mounted on the portion of the before mentioned stud 303a (Fig. 23), which passes through collar 380 secured to the left side frame plate and through the left side frame plate, is an E-shaped flipper member 381 having a leftwardly protruding stud 382 acting as an anchor for one end of a spring 383 the other end of which is attached to a stud 384a secured to totalizer shifting cam 303. When shifting cam 303 is turned counter-clockwise, as viewed in Fig. 5, to subtract position, the rear end of E-shaped member 381 in trying to follow stud 384a is urged downwardly by the spring 383. When cam 303 is returned to the add position, shown in Fig. 5, the E-shaped member 381 is urged upwardly toward the position shown in Fig. 5.

After a series of adding operations, starting from positive zero, cam 303 is in the position shown in Fig. 5 and the E-shaped member is in its upper position wherein the lower arm of the E embraces ear 384 on the downwardly extending tail 372 of lever 361 (see Fig. 24) preventing movement of lever 361 even though the transfer lever 360 is rocked down by the transfer pawl of the highest order totalizer wheel on a subsequent add operation. After a series of subtract operations during which the amount in the totalizer passes from positive to negative the ear 384 will be embraced by the upper arm of the E which prevents lever 361 from movement on a subsequent operation in which the transfer lever 360 is rocked down.

Fig. 18, like Fig. 5, shows the disposition of lever 361 and E-shaped member after a series of adding operations starting with positive zero. It is apparent that if the transfer pawl tooth trips the highest order transfer lever, latch lever 361 is unable to move to enter the "fugitive one" into the lowest order, the ear being caught by the upwardly extending lip of the lower embracing arm of the E. This state of affairs continues as long as items are continuously added. Now, if the next item is a subtract item less than the positive amount in the totalizer cam 303 will be rocked to urge E-shaped lever 381 downwardly which movement it cannot complete, as the underside of the center tongue of the E strikes the ear 384. If, then, lever 361 is permitted to rock counter-clockwise, as seen in Fig. 18, because on a subsequent subtract entry the subtract transfer tooth of the highest order totalizer wheel has rocked the highest order transfer lever down, the "fugitive one" will be entered. This condition is shown as about to happen in Fig. 19 where the totalizer wheel of the highest order turning subtractively carries with it transfer pawl 385 in the direction of the arrow. One more unit of movement will cause subtract tooth 386 to rock lever 360 down, allowing lever 361 to rock so ear 384 escapes from under the tongue of the E, as shown in dotted line, whereupon the E-shaped member drops down until the upper lip of the E strikes ear 384. At the commencement of the next cycle of operation the lever 361 is restored to latching position which traps ear 384 within the embrace of the upper arm of the E as long as subtract operations are continued. If, then, an addition operation is commenced, cam 303 is shifted causing E-shaped member 381 to be urged upwardly and ear 384 will be struck by the upper edge of the tongue thereof but will not by-pass it until the add transfer pawl tooth (Fig. 22) knocks down the transfer lever as the highest totalizer wheel passes through zero going in a positive direction. When that happens lever 361 is rocked counter-clockwise entering the "fugitive one" into the units order totalizer wheel and when the next machine operation is commenced the ear 384 will be trapped by the lower embracing arm of the E.

The position of the E-shaped lever 381 (Fig. 22) indicates whether the accumulated total is negative or positive and that position controls the selection of the totalizer to take a negative or positive total and such mechanism, shown in Fig. 23, will be explained in connection with total and sub-total taking operations.

*Totalizer engaging mechanism for add and subtract operations*

As previously described in connection with Fig. 27, totalizer engaging lever arm 286 is rocked counter-clockwise, to disengage the totalizer, through the action of cam slot 288 on roller stud 287. Totalizer engaging cam lever 289 is rockably mounted on a stud 402 secured to the inside of the right frame plate 70 and is movable within the limits imposed by cam slot 288. Pinned to shaft 55 and moving with plate 131 (Fig. 3) to which it is pinned by stud 132 (see also Fig. 4) is a drive arm 403 rocked each machine cycle first counter-clockwise to the dotted line position it has at the end of the first half of the cycle, as shown in Fig. 27, and then clockwise to home position shown in full line. On the upper end of arm 403 is a lever 404 pivoted on stud 405 and normally urged to a line radial with the center of shaft 55 by a spring 406 and having a hook portion 407 which embraces a stud 408 in the rearwardly extending arm of a three-armed lever 409 pivoted on stud 410 extending inwardly from the right side frame plate 70. As a machine cycle commences, lever 404 immediately rocks lever 409 counter-clockwise and after doing so leaves stud 408 and straightens out to the radial position indicated by spring 406 until cam edge 411 thereon strikes stud 412 causing lever 404 to rock clockwise on stud 405 until a tail surface 413 thereon strikes stud 414 on arm 403 whereupon pressure is exerted on stud 412 rocking lever 409 to home position just at the end of the first half cycle of a machine operation. On the second half of the machine cycle arm 403 moves to home position, and lever 404 rehooks on stud 408. A spring-urged stud 415 is provided to engage either in notch 416 or 417 to hold lever 409 in either home position or moved position. Stud 415 is secured to a lever, not shown, pivoted to the right side frame and urged by a spring in the effective direction. Pivoted at 425 to an upwardly extending arm of lever 409 is a lever 418 having three arms, a rearwardly and downwardly extending arm 419 having a stud 420, a downwardly and forwardly extending arm having a notch 421 and a forwardly extending arm 422 having a notch 423. Lever 418 is constantly urged clockwise around pivot 425 by a spring 424. Lever 418 normally is kept with stud 420 in contact with surface 426 of a lever 427 pivoted on stud 428 which remains in the position shown except in total-taking and sub-total-taking operations when it is rocked counter-clockwise by the total or sub-total keys. Notch 421 is thereby kept engaged with a stud 429 on a lever 430 rockably mounted on stud 402. Lever 430 has, on its upper end, a hook member 431 pivoted on stud 432 and normally engaging a stud 433 on lever 289 because of the urge of spring 434. Stud 433a on lever 430 is in contact with the forward edge of the upwardly extending arm of lever 289. Under such circumstances, as lever 409 is rocked counter-clockwise at the beginning of the machine cycle and clockwise to home position at the end of the first half of the machine cycle, lever 430 and lever 289 hooked thereto by hook member 431 rocks first clockwise to disengage the totalizer and then counter-clockwise to engage the totalizer at the end of the first half of the machine cycle. This is the totalizer engaging timing for add and subtract operations.

*Non-add operation*

In a non-add operation key 28 (Fig. 31) mounted on studs 435 and 436 (Fig. 6) secured on bracket 225 mounted on the right inside wall of the casing is depressed against the action of spring 437. Arm 438 thereof, presses down on stud 438a (Fig. 31) on lever 439 secured to a shaft by screw 440 rocking it. Said shaft also has secured thereto a bell crank lever 441 pivoted by stud 445 to the forward end of a link 442 the rear end of which is pivoted to a bell crank lever 443 urged counter-clockwise by a spring 444. As bell crank lever 441 rocks, to where stud 445 hits the rear end of a slot in side frame plate 70 in which it rides, it draws link 442 forward causing stud 446 to rock lever 447, mounted on stud 447a in the right side frame plate 70, to the dotted line position shown where it is held temporarily by latch piece 475, as will be explained. Lever 447 has a stud and slot connection with link 448 pivoted at the top end to a bell crank lever 449 pivoted on shaft 351. Bell crank 449 normally is urged counter-clockwise against a stop stud 450 by spring 451. In all but non-add operations stud 452, on a rearwardly extending arm of link 448, has no effect on hook member 431 of totalizer engaging actuating lever 430 (see also Fig. 27). On non-add operations, as shaft 130 rocks counter-clockwise on the first half cycle roller stud 130a will ride over the surface 435 of lever 447 causing it to be rocked farther clockwise, forcing link 448 to rise. At this time stud 452 embraced by notch 454 of hook member 431 rocks hook member 431 counter-clockwise disengaging actuating lever 430 from totalizer engaging camming lever 289 (see Fig. 27). Thus, although lever 289 is rocked clockwise at the beginning of a non-add machine operation, through the action of stud 433a, hook member 431 is rendered ineffective during the middle of the first half of the machine cycle, leaving the totalizer disengaged until the end of the machine cycle when plate 455, on its way to the home position after being rocked first counter-clockwise and then clockwise by shaft 130 to which it is pinned, returns lever 289 to home position by striking stud 456 of an arm thereof. The non-add key is held against operation when the total key or sub-total key has been depressed because of the movement of lever 460 to the dotted line position as will be explained in connection with total taking, preventing bell crank lever 441 from being rocked.

Depression of the non-add key and the consequent forward shift of link 442 also starts the machine operation. Referring to Figs. 4, 31 and 40, there is pivotally mounted on stud 447a three latch pieces 475, 476 and 477. Latch piece 477 is used only in total operations and sub-total operations. Latch piece 476 has a forwardly projecting tongue 479 normally blocking the counter-clockwise movement of lever 480 (Fig. 4) pivoted on screw stud 482 and urged by spring 483 so foot 481 makes contact with said tongue. Latch piece 475 (Fig. 40) has a forked arm embracing stud 446 on link 442 and a forwardly projecting portion comprising a tongue 484 and a sidewardly projecting pin 478 extending into the bottom of a notch in latch piece 476. As link 442 moves forward on operation of the "non-add" key, latch piece 475 rocks clockwise and pin 478 rides up in the notch of latch piece 476 bringing tongue 484 in front of foot 481 of lever 480 and rocking latch tongue 479 upwardly out of the path of foot 481. Continued movement of link 442 displaces tongue 484 upwardly until foot 481 moves under tongue 484 allowing lever 480 to rock counter-clockwise and preventing rearward movement of link 442, until the end of the machine cycle, if and when the operator removes his finger from the "non-add" key and it is restored to its normal position. The rocking of lever 480 counter-clockwise causes a forwardly extending arm 490 (Fig. 4) thereof to strike a stud 491 (see also Fig. 3) extending inwardly from the diverging point of the rearwardly extending two arms of bell crank trip lever 492 rockably mounted on stud 493 secured in lever 68. Tail 494 of trip lever 492 has a bent-over ear which bears against upwardly extending arm 233 of lever 68 and is held there by the spring 108 extending between tail 494 and an ear 496 on a forward arm of lever 68. The spring coupled levers 68 and 492 are, as an assembly, held rocked counter-clockwise by spring 71, so the forward arm of lever 68 rests against the side frame 70. The consequent rocking of lever 68 releases the machine which then commences a cycle of operation.

Lever 480 (Fig. 4) has a by-pass pawl 497 which is by-passed by stud 189 (Fig. 3) on plate 135 during the first half of a machine cycle. During the last half of the machine cycle stud 189 rides upwardly against surface 498 of by-pass pawl 497 rocking lever 480 clockwise to home position. Latch piece 475 (Fig. 40) then may drop so tongue 479 of latch piece 476 holds lever 480 in home position.

*Total taking*

A total-taking operation, taking two machine cycles, is commenced by depressing "total" key 27 (Figs. 1, 6 and 30) slidably mounted on studs 500 and 501, secured in bracket 225 fastened on the right inside of the machine casing, and normally urged upwardly by a spring 503. A finger 504 of said key strikes a stud 505 (Fig. 30) on the total key slide plate 506 slidably mounted on studs 507 and 508 secured in the right side frame plate 70 and normally held in the up position by spring 510. A locking formation 511 on slide plate 506 cooperates with a stud 512 (Fig. 3) on lever 513 pivotally mounted on screw stud 514 secured in the right side frame plate 70 and urged counter-clockwise by spring 515. When the total key is in unoperated position stud 512 rests on surface 516 (Fig. 30) and when the total key is depressed stud 512 rides over formation 511 and comes to rest on surface 517. A formation 518 (Fig. 3) on the sub-total slide plate 519 mounted to the outside of total slide plate 506 and also cooperating with stud 512 in the manner described in connection with total slide plate is provided to control the sub-total slide plate also, as on sub-total operations, to be described, both the total slide plate 506 and the sub-total slide plate 519 are moved downwardly together by the sub-total key. By preventing the rocking of lever 513 from the position shown in Fig. 3, either the total slide plate or the sub-total slide plate or both may be held locked in operated or unoperated position.

Each time the machine is tripped lever 111 (Figs. 3 and 7) is rocked counter-clockwise as seen in Fig. 7. A hole 522 is provided in its right end to receive the tail of lever 520 (Fig. 3) rockably mounted on screw stud 521. Lever 520 has a surface 522a which is brought under a stud 523 on by-pass pawl 524 pivoted by stud 525 to an upwardly bent portion of the rear end of lever 513. The rocking of lever 111 rocks lever 520 counter-clockwise to bring surface 522a under stud 523 preventing the rocking of lever 513. Thus the total and sub-total slide plates are prevented from movement during a machine cycle of an item entering operation until lever 111 is restored, or during the two cycles of a total or sub-total operation until lever 111 is restored. This means that on item entering operations the total and sub-total keys can not be depressed and that if one or the other has been depressed for total or sub-total operations then such are not released until lever 111 has been restored. The by-pass mounting of pawl 524 is a safety device to prevent breakage of parts and is so arranged that if lever 520 is moved toward stud 523 as stud 512 is riding over formations 511 or 518 pawl 524 will give, by rocking clockwise around stud 525 against the urge of spring 529 which normally holds forwardly extending bent-over arm of pawl 524 against the upper surface of lever 513.

As the total key is depressed a stud 530 (Fig. 30) strikes the arm of a bell crank lever 531 pivoted on stud 201 rocking it clockwise. Total lever 540 rockably mounted on stud 541 secured in right side frame plate 70 is held in position shown in Fig. 30 by connection to stud 542 on bell crank lever 531 through a disconnectable link 543, pivoted to lever 540 by stud 544. Link 543 has at its upper end a notched slot 545 in which stud 542 rides. Stud 542 normally rides in the notch at the upper end of the slot so that on the clockwise rocking of bell crank lever 531 link 543 is forced downwardly and forwardly, rocking total lever 540 counter-clockwise. Stud 540a on lever 540 strikes the lower rearwardly extending arm of lever 492 tripping the machine and commencing a cycle of machine operation. Simultaneously with the rocking of total lever 540 (Fig. 3) a latch 540b pivoted to a plate 540g and held against a stud 540c on lever 540 by spring 540e engages shoulder 540f on bell crank lever 540h. Plate 540g and bell crank lever 540h are both pivotally mounted on stud 541. The rearwardly extending arm of bell crank lever 540h has a stud 540k which bears against the edge of a cam plate 540L, secured to drive plate 135, under the influence of spring 540m. As the machine cycle commences drive plate 135 rocks counter-clockwise and cam plate 540L rocks bell crank lever clockwise, carrying with it in the same direction, through latch 540b, the plate 540g (see Fig. 30). Plate 540g is pivoted to slide 546 thereby is moved rearwardly, against the action of spring 548, where it is latched, as will be explained, until after the beginning of the second machine cycle. On the last half of the cycle by-pass pawl 550, which was ineffective during the first half cycle, strikes stud 551 uncoupling stud 542 from its notch and permitting link 543 and lever 540 to restore, thus disengaging latch 540b from shoulder 540f (Fig. 3). Stud 542 reengages the notch in slot 545 at the end of the second cycle as total slide 506 and bell crank lever 531 are restored. The forward end of link 546 is pivoted to a support link 553 which in turn is pivoted to a stud 554 in the right side frame plate 70. As link 546 is drawn to the rear during the first half of the first machine cycle, several things are made to occur. First, spring anchor stud 560 (see Figs. 3 and 9), normally in the position shown in Fig. 3, when drawn rearwardly with link 546, moves under the bent end 561 of lever 562, pinned to shaft 563, rocking it counter-clockwise. Also pinned to shaft 563, which is journaled in the side plates 70 and 72 and extends therebetween, are two rearwardly extending arms, the right one 564 being shown in Fig. 9, supporting stop bail 142 which is brought, by the rocking of shaft 563, to effective position as shown in Fig. 9 in front of the forward edges of plates 141 of all the stop bars, to keep them from movement during the first machine cycle. The bail 142 is restored to normal ineffective position early in the first half of the second machine cycle as link 546 returns home, as will be explained, under urge of spring 548. Second, as has been said, stud 540a (Fig. 30) strikes the lower arm of trip lever 492 starting a machine operation. Third, notch 568 embracing a stud 569 (see Figs. 4 and 9) in a bell crank lever 570 secured to collar 571 (see also Fig. 23) rotatable on shaft 296, rocks said bell crank lever counter-clockwise which, also, through lever 573 secured to collar 571 rocks bail 574, rockably mounted on shaft 296, counter-clockwise through the action of stud 575 mounted on lever 573 striking its downwardly extending arm 576. Secured to the left support arm of bail 574 is a bell crank 578 having an upwardly extending arm to which is pivoted a three-armed lever 579. A spring 580 anchored between forwardly extending arm of bell crank 578 and a forwardly extending arm of lever 579 normally keeps arm 581 of lever 579 under and in contact with stud 582 on a forwardly extending arm 583 of E-shaped flipper member 381. The parts in Fig. 23 are shown as though the totalizer was in a positive condition, that is with the E-shaped flipper member rocked clockwise, as viewed from the left side of the machine, in the up position. In such circumstances the stud 582 has pushed down on arm 581, against the urge of spring 580, to a point where a hook 584 on the third arm of lever 579 is in a plane lower than that of square stud 585 extending to the right from subtract link 299 so that when bail 574 is rocked by the action of slide 546 on stud 569, the forward excursion of hook 584 will not catch stud 585. However, if the E-shaped member 381 is in the negative condition, where it is rocked downward, indicating a negative total in the totalizer, the forward excursion of hook 584 draws stud 585, and link 299 forward which, through stud 300 draws lever 301 forward (see also Fig. 5) conditioning the machine for taking the total through the idler pinions of the totalizer in which case the totalizer pinions will be reversely rotated to the 9999999999 condition. Bail 574 is restored in the second machine cycle with bell crank lever 570 and link 546. Stud 586 lying in front of support arm 576 acts as a stop against clockwise movement of the bail from normal position. Fourth, as bell crank lever 570 (Fig. 4) rocks counter-clockwise its forwardly extending arm 600 lowers allowing stud 601 and latch member 602 to drop in response to the urge of spring 610 from the position shown in Fig. 4 to where a bent-over ear 604 (Fig. 27) is riding on top of total control link 603. Latch member 602 is pivoted to a link 605 pivoted at its rear end to bell crank lever 606 urged clockwise, by spring 606a, on its support pivot 607 secured in right side frame plate 70 so roller stud 608 will ride the edge of plate 455 secured on shaft 130. As plate 455 rocks counter-clockwise at the beginning of the first machine cycle of a total operation, link 605 moves forward until ear 604 of latch member 602 drops into notch 609 of link 603. On the second half of the first machine cycle link 605 is moved rearwardly carrying with it total control link 603 against the action of spring 611 (see Fig. 4) normally urging it to a forward normal position determined by stud 612 held in right side frame plate 70. As link 603 moves rearwardly, latch piece 477 (Fig. 40) is rocked counter-clockwise by connection to link 603 through forked arm 613 of latch piece 477 embracing stud 614 on link 603. Latch piece 476 is normally held in effective position, where tongue 479 thereof blocks foot 481 of lever 480 (Fig. 4), by the resting of stud 617 (Fig. 40) on the upper edge of latch piece 477. Stud 615 extending from latch piece 477 strikes tongue 479 of latch piece 476 moving the tongue 479 down from in front of foot 481 of lever 480. At the same time the tongue 616 of latch piece 477 moves down past foot 481, whereupon lever 480 (Fig. 4) rocks counter-clockwise causing arm 490 to make contact with stud 491 (Fig. 3) of machine trip lever 492 holding it down against the return urge of spring 109 (Fig. 30) as total lever 540 moves to home position, at the close of the first machine cycle. As the foot 481 of lever 480 moves over the upper surface of tongue 616 of latch piece 477 (Fig. 40), link 603 is latched in rearwardly moved position. This occurs after the restoring movement is given lever 480 by stud 189 (Fig. 3) in the first cycle. On the second machine cycle, as will be described, stud 189 restores lever 480 permitting the total control mechanism to restore to home position.

As link 603 (Fig. 27) is moved rearwardly, it rocks lever 427 counter-clockwise around stud 428 during the last half of the first machine cycle and holds it rocked so surface 426 is away from roller stud 420 as lever 494 rocks lever 409. Notch 421 of lever 418 which is urged upwardly by spring 424 is released from engagement with stud 429 of lever 430 which otherwise would be rocked clockwise to disengage the totalizer on the first part of the first half of the second machine cycle. The differential racks on their forward movement in the first half of the second machine cycle reversely rotate the totalizer pinions to zero, the transfer pawl teeth striking the associated stop surfaces 327 and 330 of the transfer levers, depending on whether the total is positive or negative. The totalizer wheels will be returned to 0000000000 if the total taken is positive or 9999999999 if the total is negative. At the beginning of the last half of the second machine cycle notch 423 of lever 418 is in engagement with stud 452 of lever 430 (see Fig. 31) rocking lever 430 clockwise, carrying lever 289 (Fig. 27) with it to disengage the totalizer from the racks so the totalizer will remain zeroized.

During the first half of the second machine cycle, as plate 455 is rocking counter-clockwise, link 605 moves forward and link 603 remains stationary, being locked by latch piece 477 (Fig. 40) in rearward position. As latch ear 604 (Fig. 27) of latch 602 moves out into notch 609 the pull of spring 548 (Fig. 30) on link 546 will return total lever 540 and link 543 to normal position, as bell crank lever 570 can rock clockwise lifting latch 602 up. When lever 480 (Fig. 4) is rocked clockwise by stud 189 (Fig. 3) near the end of the second machine cycle link 603 no longer restrained by latch 602 or latch piece 477 (Fig. 40) moves to normal position, the machine tripping mechanism relatches, and the total key thus is released permitting stud 542 (Fig. 30) to re-engage in the notch in link 543.

As link 603 is moved rearwardly during the last half of the first machine cycle lever 618 (Fig. 4), pivoted to the forward end thereof, is rocked counter-clockwise so that through action on stud 619 the key release bail is operated to release any digit keys that may have been unintentionally depressed. This also moves the zero stops to ineffective position. The key release bail is returned to ineffective position as link 603 returns to normal position at the close of the second machine cycle. In the meantime the differentials have made their totalizing excursions.

The time of totalizer engaging is the same whether a positive or negative total is being taken.

After total-taking operations, lever 301 (Fig. 5) always returns to add position under the urge of spring 670 to be described. If the total was negative the totalizer wheels are standing at 9999999999 and a positive entry thereinto will bring into operation the "fugitive one" mechanism. For instance, if the digit five be added, the totalizer wheels then will register 0000000005.

If a negative total has been taken and a negative amount entered, no "fugitive one" is entered. If a positive total has been taken and a negative amount entered the "fugitive one" will be entered as the totalizer passes to the negative side.

On total taking the differential mechanism and, hence, the printing bars will be moved the true amount of the total, be it positive or negative, during the second machine cycle. The printing of a total occurs at the mid-point of the second cycle of operation. On the first cycle, as no movement of the differential occurs, there is no printing operation, the printing hammers not being released. At the end of the second cycle of machine operation lever 111 (Fig. 7) is rocked clockwise which also causes lever 520 (Fig. 3) to rock clockwise releasing the total key.

*Sub-total taking*

In sub-total taking operations key 26 (Figs. 1 and 6) slidably mounted on studs 620 and 621 extending from bracket 225 and normally held in the up position by spring 622, is depressed. Army 623 thereof strikes stud 624 (Fig. 3) on sub-total slide plate 519 slidably mounted on studs 507 and 508, forcing it downwardly carrying the total slide plate 506 (see also Fig. 3) with it as stud 505 thereof extends into the upper end of a slot on sub-total slide plate 519. All of the machine parts operated by total slide plate 506 on total taking operations are operated on sub-total operations except insofar as the action of sub-total slide plate 519 changes the timing of totalizer engaging so the totalizer will remain in engagement with the differential racks throughout the second machine cycle setting the printer bars to print the amount in the totalizer at mid-cycle.

Referring to Fig. 28, as sub-total slide plate 519 is forced down by key 26 an arm 625 thereof strikes stud 626 on plate 627 rockable on stud 628, projecting from the right side frame plate 70, rocking plate 627 counter-clockwise. Pivoted to plate 627 is a link 629 in turn pivoted to plate 630 rotatable on shaft 653 extending between the side frame plates 70 and 72. This also rocks plate 630 counter-clockwise carrying with it plate 632 side spaced from plate 630 and rockably mounted on shaft 653, connection being made between plates 630 and 632 by pin 633 (see also Fig. 4). Pivoted to lever 427 (Fig. 28) is a link 634 coupled to plate 632 by a pin and slot connection. On total-taking operations lever 427 rocks counter-clockwise, as has been explained, raising link 634 in an idle movement permitted by the pin and slot connection to plate 632. The same thing occurs on sub-total taking operations except that the upper end of link 634 is moved to the rear by the rocking of plate 632. This positions roller stud 635 so lever 418 (see Fig. 29) cannot couple with lever 430 to disengage the totalizer during the last half of the second machine cycle, thus causing the data cleared from the totalizer on the first half of the second machine cycle to be returned thereto. Spring 636 (Fig. 28) returns the parts 627, 629, 630 and 632 to normal position on release of the sub-total key as lever 520 (Fig. 3) is rocked clockwise at the end of the second cycle through movement of lever 111 (Fig. 7) by the resetting of the machine release mechanism heretofore described.

*Ribbon shifting mechanism*

Means is provided to shift a bichrome printing ribbon 637 held in guides 638 and 639, (Fig. 41) located between the type bars 30 and platen 92 and wound on spools 640 and 641, from a normal position, in which it prints added items and positive totals in black, to a raised position when printing subtracted items and negative totals, in which the print will be in red.

Referring to Fig. 16 which shows the left ribbon spool 640, the left ribbon guide 638 and the left ribbon guide support plate 642, said guide support plate 642 is forked at the lower end and embraces shaft 99 extending between the printer frame plates 643 and 644 (Fig. 41). The upper end of ribbon guide support plate 642 is held against movement, except for vertical shifting, by a bent-over portion 645 which cooperates with printer frame plate 643 for such shifting. Rotatable on shaft 99 (Figs. 16 and 17) is a cam plate 646 on the periphery of which rides stud 647 extending from ribbon guide support plate 642. Also extending from ribbon guide support plate 642 is a stud 648 which rides in a slot 649 in a cam plate 646. Rocking of cam plate 646 clockwise will cause a vertical movement upward of ribbon guide support plate 642. Extending from the top of ribbon guide support plate 642 is a stud 650 (see also Fig. 41) which rides in the forked end of an arm 651 extending rearwardly from a sleeve 652 rotatable on shaft 653 extending between side frame plates 70 and 72. On the right end of sleeve 652 is an arm 654, like arm 651, which embraces stud 655 on the right ribbon guide support plate 672 so that the vertical movement of left ribbon guide support plate 642 will be duplicated by the right ribbon guide support plate 672 mounted in the printer frame like ribbon guide support plate 642.

In the normal position of the parts, as shown, the ribbon guides are in the down position where the type will hit the upper half of the ribbon which is black. In the up position of the ribbon guides the type will hit the lower half of the ribbon which is red, causing a red print.

The shifting upward of the ribbon guides, caused by the rocking of cam plate 646 clockwise, occurs during subtract, negative total operations, and negative sub-total operations in the following manner. Shaft 55 (Fig. 17), heretofore described, is rocked counter-clockwise during the first half of a machine cycle and clockwise during the second half of a machine cycle. Arm 656a thereon, through link 657, rocks plate 658, pinned on shaft 99, clockwise and then counter-clockwise during a machine operation. A latch 659 constantly is urged to latching position in notch 660 of cam plate 646 by spring 661 but is normally held from latching position by the cam edge 662 (see Fig. 16) on an arm 663 rockable on shaft 653 extending between the machine vertical side frame plates 70 and 72. Arm 663 is part of a bail 664 (see Figs. 5 and 41) the left arm 665 of which also is rockably mounted on shaft 653. Arm 665 is connected by link 666 with lever 667 pivoted on stud 668 in the left side frame plate 72. A lower extending arm of lever 667 has a stud 669 normally held in the rear end of slot in link 299 by spring 670. In the normal add condition of the machine in which lever 301 is in the position shown in Fig. 5 at the beginning of a cycle in which printing is to be done, that is in the single cycle of an item entering operation or in the second cycle of a total-taking operation, the ribbon guides will be undisturbed in the ensuing machine cycle from their lower position in which a black print is made. As soon as the lower end of lever 301 is drawn forward by depression of the subtract key or by lever 579 (Fig. 23) in negative total operations and negative sub-total operations, link 666 (Fig. 5) is drawn down rocking bail 664 and causing latch 659 (Figs. 16 and 17) to engage with the notch 660 causing the ribbon guides to raise during the first half of the machine cycle so a red print will be made at mid-cycle. Plate 658 also rocks a shaft 671 (see also Fig. 2) each machine cycle to recock the printing hammers.

Symbol printing

The right-hand printing bar 700 (Figs. 32, 36 and 41) contain seven type-bearing symbols for indicating the kind of operation being performed.

Referring to Fig. 32, the top-most type 701 is for printing the symobl "Δ," which symbol following the print of the first added item following a total-taking operation indicates that the totalizer was clear. The mechanism for printing such symbol is described in the Frieberg et al. application, Serial No. 171,119, to which reference was made.

Type 702 bears a minus symbol "—," indicating that the item entered and printed was subtracted. This will be printed in red as described in connection with the ribbon shifting mechanism.

Type 703 prints the symbol "S" indicating the printed item was a sub-total of a positive balance.

Type 704 prints the red symbol "CR" indicating the printed item was a sub-total of a negative balance.

Type 705 prints the symbol "*" indicating the printed item was a total of a positive balance.

Type 706 prints the red symbol "Cr" indicating the printed item was the total of a negative balance.

Type 707 prints the symbol "#" indicating an item printed but not entered in the totalizer, i. e. that it is non-add item.

Fig. 32 shows the symbol bar 700 in lowermost position where type 701 will print on an add entry following a total-taking operation but not otherwise. The type bar 700 will be in the same position on subsequent add entries but the printing hammer is latched so no printing operation takes place.

Referring to Fig. 32, at the lower end of printer bar 700 is a stud 718 embraced by the forked end of bell crank lever 719 rockable on a shaft-like stud 720 (see Fig. 41) supported by and extending inwardly from the right vertical side frame plate 70. Rocking of lever 719 counterclockwise from the normal position shown in Fig. 32 causes printer bar 700 to rise so stud 718 is positioned to the dotted circle positions 721 in succession. Referring to Fig. 33, lever 719 is held against a stud 722 on link 723 pivoted to lever 724 rockable on stud 725 supported in right printer frame plate 644 (Fig. 41). Right ribbon guide support plate has a stud 726 (Fig. 33) which rides in a slot 727 in lever 724. Therefore, as ribbon guide support plate 672 rises during a subtract operation, a negative total operation, or a negative sub-total operation, stud 722 rides up against surface 728 of bell crank lever 719 causing said lever to rock counter-clockwise a step of movement corresponding to the distance required to raise printer bar 700 from one type to the next lower type. Thus, for instance with the lever 719 adjusted, as will be explained, so the clear signal type 701 is in printing position as indicated by the stud 718, the rise of the ribbon guide support plate 672 causing stud 722 to strike surface 728 (see Fig. 34) will cause lever 719 to rock so type 702 will be in printing position as indicated by the new position of stud 718 seen in Fig. 34, said type 702 being the minus symbol "—." Lever 719 receives its principal adjustment through being held against stud 722 by spring 729 anchored to lever 730. Lever 730 has a slot 731 in which stud 722 rides. Lever 730 has a bail portion 732 depending from which is a rocker arm 733 held by spring 734 against stud 83 of link 82 which, as before described, moves rearwardly during the first half of a machine cycle and forwardly to home position during the second half of a machine cycle. On add and subtract operations lever 730 (see Fig. 32) is not permitted to move from home position as a bent-over ear 735 on an arm 736 extending from bail 732 strikes surface 737 on arm 738 pivoted on stud 739 secured in right frame side plate 70. The type bar 700, therefore, will be positioned with the clear sign "Δ" in printing position on add operations and the subtract sign "—" in printing position on subtract operations. On total operations bell crank lever 427 rocks counter-clockwise before printing time causing link 639 to rise. A stud 740 on link 639 raises arm 738 and an arm 741 also pivoted on stud 739 until surface 742 on a bracket 743 secured to arm 741 is in line with the path of movement of ear 735. This causes type bar 700 to rise until the total symbol type 705 is in printing position if the total is positive, or until the negative total symbol type 706 is in printing position if the total is negative. On sub-total operations the top of link 639 moves rearwardly so stud 740 moves to a cutaway surface on the underside of members 741 and 738 so that surface 744 (Fig. 35) is contacted by ear 735 positioning to printing position the sub-total symbol or the negative sub-total symbol if the balance is negative. On non-add operations link 442 (see also Fig. 31) is drawn forward, rocking bell crank lever 443 pivoted on stud 746, mounted in right vertical side frame plate 70, causing a link 747 coupled thereto by pin and slot connection to rise. Link 747 at its upper end is pivoted to arm 738 which is thereby lifted allowing ear 735 to move over the top of arm 741 causing the full rise of type bar 700 so the non-add type is in position at the printing line as determined by the contact of the lower end of rocker arm 733 against the roller stud 83.

Symbols are printed by a hammer similar to the one described in connection with the printing of digits.

*Paper feeding mechanism*

Referring to Fig. 5, platen 92 is secured on a shaft 775 journalled in two support plates 776 and 777 (Fig. 41). Secured on shaft 775 at the left end is a ratchet wheel 778 (Fig. 5). To the side of ratchet wheel 778 and rotatable on shaft 775 is a plate 779 to which is pivoted feed pawl 780 urged into contact with the ratchet wheel by spring 781 but normally held away from the ratchet by contact of tail 782 of the feed pawl with stud 783 extending from plate 776. Link 784, pivoted to plate 779 and having a forked lower end embracing a stud 785, is pulled down to rock plate 779 clockwise whereupon pawl 780 engages the ratchet to turn the shaft and platen in a paper feeding direction. Stud 785 is on a link 786 having a slot 787 in its lower end embracing a stud 788 in side frame plate 72, said stud also acting as the lower anchor of a spring 789 anchored at its top to stud 790 in link 786. Cam surface 791 on the foot of link 786 is held in contact with roller stud 792, supported by a plate secured to shaft 55, by spring 789. As stud 792 rocks downwardly on the first half of a machine cycle, link 786 follows, except as will be noted, giving pawl 780 a non-feed movement around ratchet wheel 778 and, on the upward movement of said stud, on the second half of the machine cycle, link 786 is raised to home position giving the platen the paper feeding movement. The extent to which link 786 is allowed to follow stud 792 determines the extent of the paper feed.

Figure 8:
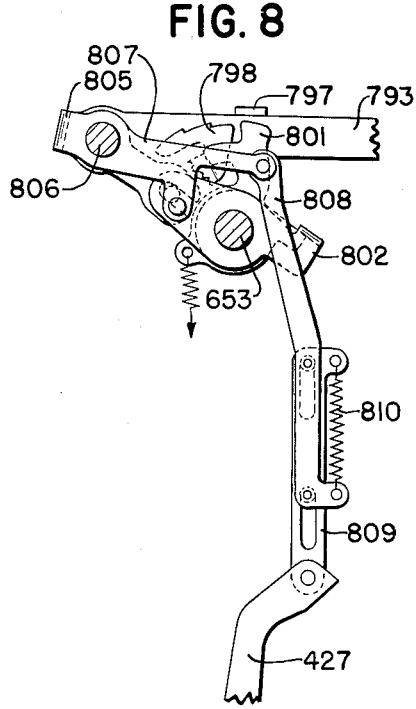
Fig. 8 is a right side view of the mechanism for giving the paper an extra feeding motion on total-taking operations.

Pivoted to the upper end of link 786 is a lever 793 pivotally mounted on the left end of shaft 806. A bent-over ear 795 has a slot which rides the vertical edge of guide 796 for lateral support of lever 793. A bent-over ear 797 cooperates with a stepped plate 798 (see also Fig. 8) positioned by lever 33 (see Fig. 1) so that in the rearmost position of lever 33 lever 793 will be allowed to move a distance equal to one line space, in the next position forward lever 793 will be allowed to move a distance equal to two line spaces, and in the complete forward position plate 798 is moved from under ear 797 and a plate 799 (Fig. 5) mounted on shaft 653 and urged clockwise by spring 800 follows plate 798 to a point where it surfaces 801 is under ear 797 permitting lever 793 to move a distance equal to one line space each item entering machine operation. However, plate 799 may be rocked to its original position counter-clockwise by downward movement of bail 802 rockable on shaft 653, such downward movement occurring on the second cycle of a total-taking operation. This removes surface 801 from under ear 797 and lever 793 is permitted to move a distance equal to six line spaces so the record material is fed so the just-printed total is above a tear-off bar 803 (see Fig. 1). Referring to Fig. 41, the right end of bail 802 is pivoted by stud 804 to a slot in an arm of bail 805 rockably mounted on shaft 806 extending between the side frame plates 70 and 72. The right arm 807 of bail 805 is pivoted to link 808 (Fig. 8) coupled by a double pin and slot sliding connection to link 809 which in turn is pivoted to the upper end of lever 427 (see also Fig. 27) which lever is rocked so as to force link 809 upwardly and hold it there during the paper feeding period of a total-taking operation. Spring 810 holds links 808 and 809 in extended relation as shown in Fig. 8 to effect the rocking of bail 805. If bail 805 is held from movement so is link 808 and upward movement of link 809 is lost in the stud and slot connection between links 808 and 809. Referring to Fig. 4, arm 807 of bail 805 has a stud 810 embraced by hook 811 of plate 632, as it is rocked counter-clockwise during a sub-total taking operation, preventing bail 805 from being rocked by link 808, the motion of link 809 being taken up in the stud and slot connection between links 808 and 809. Thus, the extra feed of the paper is not given on sub-total operations.

*Control key interlocks*

Referring to Fig. 6, sliding locking plates 812, 813, 814 and 815 are mounted by stud and slot couplings to bracket 225 and are arranged so that there is one plate between each adjacent pair of the control keys 27, 26, 25, 24 and 28. If a key, for example key 24, is depressed a stud 816 thereon descends between plates 814 and 815, forcing plate 815 forwardly and plates 812, 813 and 814 rearwardly where they are held until key 24 is restored. Under such circumstances keys 27, 26, 25 and 28 cannot be depressed if the studs thereon, corresponding to stud 816, strike the upper edges of the locking plates forced thereunder.

Fig. 7 shows a lever 460 having a slot 817 by which it is mounted on stud 818, in the machine base. Lever 460 is held by spring 819 so that its right end 820 is held in the forward end of a slot 821 (see Fig. 3) in link 546 drawn rearwardly in operation of either the total key or the sub-total key. Locking plate 822 rockably mounted on stud 823 is rocked counter-clockwise by plate 293, rocked by the subtract key, acting on an upwardly extending arm of plate 822 bringing a surface of plate 822 in the path of movement of right end 820 of lever 460 preventing an operation of either the total key or sub-total key during a subtract operation, and bringing a stud 825 under ear 826 of lever 103 preventing the machine being released by the add key 24 on such operation. On total and sub-total operations lever end 820 is moved rearwardly by link 546 preventing the rocking of plate 822 and therefore, preventing operation of the subtract plate 293 which must rock plate 822 to move.

From the foregoing description of the machine it is apparent that multi-digit item entries may be made additively or subtractively by mere operation of the digit keys either used one at a time in a setting up operation, with an added stage of operation given the last used key, or all depressed together to the second stage or all depressed to the setting up condition with the machine operation initiated by add or the subtract motor keys. Operation of the "total" key will cause the machine to automatically print the true total be it positive or negative, and operation of the "sub-total" key will cause the machine to print the true sub-total be it positive or negative. Subtract entries and negative totals and sub-totals are printed in red followed by appropriate symbols. Control key interlocks are provided to prevent misoperation of the machine. The balance in the totalizer may be seen on indicators at any time, positive balances being readable directly and negative balances being readable as a complement to a negative zero base.

Thus it is seen that the novel cycle initiating means extends to all the digit keys of all the denominational orders, that the digit keys may be used to set up amounts with or without further operating them for initiating a machine cycle, that the amount of an entry may be set up by sequential operation of the selected keys in any order or by operating them in concert together, that the cycle initiating movement of the keys may be effected at any time after they are set up, and that the novel cycle initiating means in no way interferes with the cycle initiating function of the add and subtract control keys or with any of the normal functions of total taking, non-adding and printing, except that in the modified form of the invention the subtract key cannot start a machine operation.

While the form of mechanism herein shown and described is admirably adapted to fulfill the objects primarily stated, it is to be understood that it is not intended to confine the invention, to the one form or embodiment herein disclosed, for it is susceptible of embodiment in various other forms.

What is claimed is:

1. In a calculating machine, the combination of a plurality of denominational orders of differentially-settable means; a power means for giving the differentially-settable means excursions of movements in cycles; a plurality of rows of keys, one row of keys for controlling the extent of movement of each differentially-settable means; a light spring for maintaining each key in normal position, said springs acting to provide a light resistance to the depression of the keys into first positions wherein the keys control the differential movements of the settable means associated therewith; a latch for each row of keys; a spring for urging each latch into engagement with its associated row of keys; cam means on each key for camming the associated latch against the tension of the last-named spring; a notch in each key with which the latch is engaged when a key is moved into said first position; a slide associated with each row of keys and movable by any key of a row of keys when the key is moved past said first position into a fully-depressed position; a spring biased to urge the slides against the keys of their adjacent rows, said last named spring being heavier than said light springs to provide for a sensibly-perceptible heavier resistance to depression of a key past said first position; a common member actuated by any one of said slides when any key of any row of keys is moved past the initial position into said fully-depressed position; a normally-open switch in a circuit for controlling the power means; and means movable by the common member to close said switch as any one of said keys is moved into fully-depressed position to render the power means active when the key reaches the fully-depressed position.

2. In a calculating machine, the combination of a plurality of denominational orders of differentially-settable means; a power means for giving the differentially-settable means excursions of movements in cycles; a plurality of rows of data-representing keys, one row of keys for controlling the extent of movement of each differentially-settable means; a light spring for maintaining each key in normal position, said springs acting to provide a normally light key action for the depression of the keys into first positions wherein the keys control the differential movements of the settable means associated therewith; a latch for each row of keys; a spring for urging each latch into engagement with its associated row of keys; a notch in each key with which the associated latch is engaged when a key is moved into said first position; a slide associated with each row of keys and movable by any key of any row of keys when the key is moved past said first position into a fully-depressed position; a common spring biased to urge each slide against the keys of its adjacent row, said spring being heavier than said light spring to provide for a heavier key action for the depression of a key past said first position; a common member actuated by any one of said slides when any key of any row of keys is moved past the first position into said fully-depressed position; a normally-open switch in a circuit for controlling the power means; and means moved by actuation of the common member to close said switch as any one of said keys is moved into fully-depressed position against the heavier key action to render the power means active when the key reaches the fully-depressed position.

3. The combination of claim 2 in which the said common heavier spring for providing increased resistance accompanying the said further movement of a key is attached to the common member.

4. The combination of claim 3 in which one end of the said heavier spring is attached to an adjustable means so that the force of the spring may be adjusted in value.

5. In a calculating machine having a main operating means capable of being given cycles of operation during which data may be entered in the machine; including, in combination, a cycle-initiating means, including an element which when electrically energized causes the main operating means to cycle; a plurality of denominational rows of keys for setting up data to be entered into the machine; a light spring for each key for normally maintaining each key in normal position, said light springs providing a light key action for the operation of said keys from a normal position to a control position, in which control position the keys control entry of data into the machine during the ensuing cycle of machine operation; latches to maintain the keys in said controlling position, each of said keys being operable further; means common to all the keys to provide increased resistance to the said further operation of said keys to provide a sensibly heavier key action for movement of the keys during said further operation; and means operated by said keys during said further operation to energize the electrically-energizable means to cause the main operating means to cycle when a key is in said further operated position and before the key is restored.

6. In a calculating machine having a main operating means capable of being given cycles of operation, during which data may be entered into or withdrawn from the machine, and an electric motor energizable for driving said machine through its cycles of operation upon the closing of an electric circuit, including, in combination, machine cycle-initiating means operable to close the electric circuit to energize said motor; solenoid means energizable to operate the machine cycle-initiating means, said solenoid means including an energizing electric circuit having an electric switch therein, which switch is normally open; rows of data-representing keys, each of the keys having a light key action for setting data on the keyboard and a sensibly heavier key action for actuating the machine cycle-initiating means, the light key action being provided by a light spring for maintaining each key in a normal position, each key being individually movable from normal position into a data entry control position, at random, against the resistance of said light springs to set up a multi-digit number; latches to maintain the moved keys in said data entry control positions as they are operated one or more at a time; means to close said switch; a spring heavier than said light springs to maintain the last-named means in unoperated position, said keys being individually movable further from said latched positions to move said means against the added resistance of said heavier spring to provide said sensibly heavier key action, and to close said switch to energize the solenoid to thereby initiate a machine cycle, said further moved key also controlling the entry of data during such cycle; and means operated by the solenoid, upon its being energized, to open said switch as an incident to initiation of the machine cycle and to hold it open until the end of said cycle, even though the key which closed the switch remains in said further operated position.

7. In a calculating machine capable of performing different power-operated functions, in combination, rows of keys slidably mounted in a frame and maintained by resilient means in outward unoperated positions, said keys having a light touch for setting the keys into an initial position for setting data on the keys and a heavier touch when moving the keys a further extent for releasing the machine for operation; means to latch the keys in the initial set position wherein the keys control the data entered into the machine; movable means held in a normal position by a second resilient means which is more powerful than the first-named resilient means, said movable means, when moved, initiating a power-operated machine function; and a slide for each key row intermediate said keys and the movable means whereby the movable means is operated, by movement of the keys past the initial latched position, to initiate a power-operated function before the key is released by the operator, said second resilient means thus rendering the key action sensibly heavier to the operator to enable the operator to sense when the key reaches the machine-releasing position.

8. The device of claim 7 in which the movable means is a bail rockably mounted across the ends of the key rows.

9. The device of claim 7 in which each of said slides is given movement when a key in the associated row is moved beyond the latching position into machine-releasing position, and in which the movable means is a bail rockably mounted across the ends of the slides and held thereagainst by the second resilient means.

References Cited in the file of this patent
UNITED STATES PATENTS

| | | |
|---|---|---|
| 1,136,725 | Shiek | Apr. 20, 1915 |
| 2,210,099 | Shipley | Aug. 6, 1940 |
| 2,229,889 | Friden | Jan. 28, 1941 |
| 2,318,241 | Mathi | May 4, 1943 |
| 2,386,364 | Spurlino et al. | Oct. 9, 1945 |
| 2,552,789 | Hopkins | May 15, 1951 |
| 2,583,377 | Hurni | Jan. 22, 1952 |
| 2,654,539 | Brubaker | Oct. 6, 1953 |